(12) United States Patent
Briggs et al.

(10) Patent No.: US 11,105,905 B2
(45) Date of Patent: Aug. 31, 2021

(54) LIDAR AND CAMERA ROTATIONAL POSITION CALIBRATION USING MULTIPLE POINT CLOUD COMPARISONS

(71) Applicant: Lyft, Inc., San Francisco, CA (US)

(72) Inventors: Forrest Samuel Briggs, Palo Alto, CA (US); Lei Zhang, Campbell, CA (US)

(73) Assignee: Lyft, Inc., San Francisco, CA (US)

( * ) Notice: Subject to any disclaimer, the term of this patent is extended or adjusted under 35 U.S.C. 154(b) by 461 days.

(21) Appl. No.: 16/206,966

(22) Filed: Nov. 30, 2018

(65) Prior Publication Data
US 2020/0174107 A1    Jun. 4, 2020

(51) Int. Cl.
*G01S 7/497* (2006.01)
*G06T 7/80* (2017.01)
*G06T 7/50* (2017.01)
*G06T 7/30* (2017.01)
*H04N 5/247* (2006.01)
*G06T 7/73* (2017.01)
*G01S 17/86* (2020.01)

(52) U.S. Cl.
CPC ............ *G01S 7/4972* (2013.01); *G01S 17/86* (2020.01); *G06T 7/30* (2017.01); *G06T 7/50* (2017.01); *G06T 7/73* (2017.01); *G06T 7/80* (2017.01); *H04N 5/247* (2013.01); *G06T 2207/10028* (2013.01); *G06T 2207/20024* (2013.01); *G06T 2207/30204* (2013.01); *G06T 2207/30252* (2013.01)

(58) Field of Classification Search
CPC ...... G01S 17/86; G01S 17/931; G01S 7/4972; G06T 2207/10028; G06T 2207/20024; G06T 2207/30204; G06T 2207/30208; G06T 2207/30252; G06T 7/30; G06T 7/50; G06T 7/73; G06T 7/80; H04N 5/247
See application file for complete search history.

(56) References Cited

U.S. PATENT DOCUMENTS

| 10,565,787 | B1 * | 2/2020 | Jordan | ...................... G06T 7/33 |
| 2019/0056484 | A1 * | 2/2019 | Bradley | .................. G01S 17/42 |
| 2020/0116867 | A1 * | 4/2020 | Zhu | .......................... G01S 7/40 |

* cited by examiner

*Primary Examiner* — Farzana Hossain
(74) *Attorney, Agent, or Firm* — Baker Botts L.L.P.

(57) ABSTRACT

A method includes capturing, by a plurality of image sensors on an automotive vehicle, image data associated with one or more calibration objects in an environment, and capturing, by a LiDAR sensor, a three-dimensional LiDAR point cloud based on LiDAR data. The method further comprises generating a three-dimensional image point cloud based on the image data and the three-dimensional LiDAR point cloud, mapping a first alignment plane of the three-dimensional image point cloud relative to a second alignment plane of the three-dimensional LiDAR point cloud for each of the calibration objects to determine an angle between the first alignment plane and second alignment plane, and calibrating the LiDAR sensor relative to the image sensors by determining a degree of rotation of the LiDAR sensor to minimize the angle between the first alignment plane and second alignment plane.

20 Claims, 16 Drawing Sheets

LIDAR AND CAMERA ROTATIONAL POSITION CALIBRATION USING MULTIPLE POINT CLOUD COMPARISONS

BACKGROUND

Light Detection and Ranging (LIDAR) is a sensing method that uses a light beam to measure the distance to various objects. A LIDAR sensor works by emitting a light beam and measuring the time it takes to return. The return time for each return light beam is combined with the location of the LiDAR sensor to determine a precise location of a surface point of an object, and this location is recorded as a three-dimensional point in space. An optical camera captures and records images of the external environment. A camera works by opening an aperture to take in light through a lens, and then a light detector (e.g., a charge-coupled device (CCD) or CMOS image sensor) turns the captured light into electrical signals including color and brightness of each pixel of the image.

Autonomous vehicles typically use a LiDAR sensor to obtain depth profiles of the environment, and an optical camera to obtain image profiles of the environment in order to help navigate the vehicle around the environment. However, because the LiDAR sensor is placed next to a separate camera sensor, the positioning of the LiDAR sensor and the separate camera sensor may be misaligned during manufacturing, resulting in misalignment in the data to be collected and processed from the camera and LiDAR sensors. As such, data from the LiDAR sensor must be calibrated and aligned with the data from the camera sensor in order to accurately process data from the LiDAR sensor and camera sensor to navigate the vehicle.

DESCRIPTION OF EXAMPLE EMBODIMENTS

Figure 1:
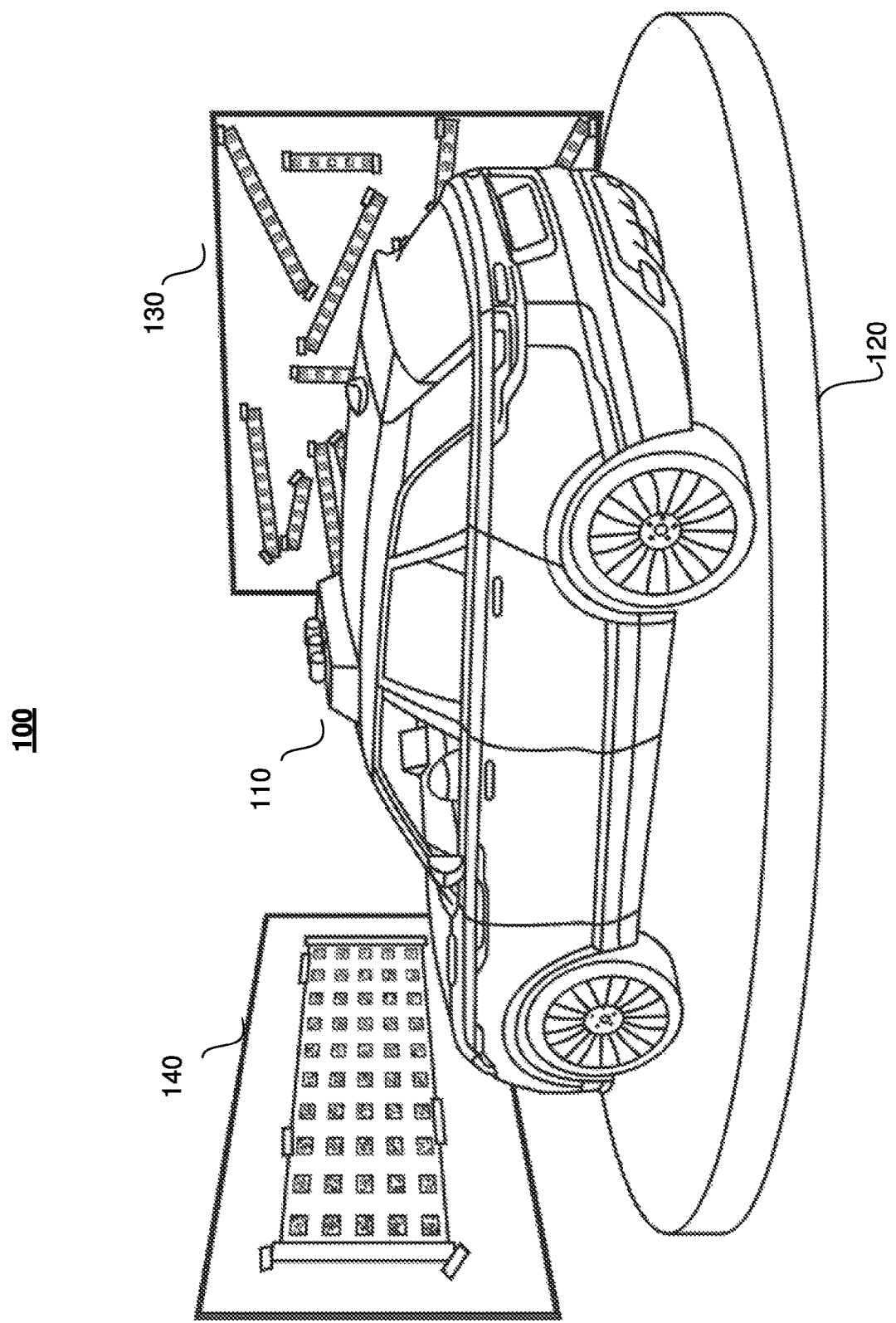
FIG. 1 illustrates an example configuration of a camera and LiDAR position calibration system with two calibration objects surrounding an autonomous vehicle.

Transportation management technology for "smart" vehicles may be used for intelligent transportation and user interaction to help optimize vehicle safety, efficiency, and user-friendliness. A vehicle may use various devices and sensors (e.g., LiDAR, cameras, radar, etc.) to sense its environment and navigate around this environment with little to no human input. In a regular manually-driven vehicle, these devices and sensor may assist the vehicle operator to more safely or efficiently operate the vehicle, for example, by using object warning detection indicators, optimizing speed for fuel economy, detecting lane markers and changes, avoiding or minimizing collisions, and/or deploying other relevant vehicle monitoring or maneuvers. In addition, these devices may help take most or full control of vehicle operation from the vehicle operator under some or all circumstances when the transportation management technology is able to recognize a dangerous or risky situation and steer or control the vehicle to avoid or mitigate the situation.

In the case of autonomous vehicles, a vehicle may be equipped with a variety of systems or modules for enabling it to determine its surroundings and safely and automatically navigate to target destinations. For example, an autonomous vehicle may have an integrated computing system (e.g., one or more central processing units, graphical processing units, memory, and storage) for controlling various operations of the vehicle, such as driving and navigating. To that end, the computing system may process data from one or more sensor arrays. For example, an autonomous vehicle may have optical cameras for, e.g., recognizing roads and lane markings, and objects on the road; LiDARs for, e.g., detecting 360° surroundings; infrared cameras for, e.g., night vision; radio detection and ranging (RADAR) for, e.g., detecting distant hazards; stereo vision for, e.g., spotting hazards such as pedestrians or tree branches; wheel sensors for, e.g., measuring velocity; ultra sound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by a navigation system to safely guide the autonomous vehicle, even without the aid of a human driver. The autonomous vehicle may also include communication devices for, e.g., wirelessly communicating with one or more servers, user devices (e.g., smartphones, tablet computers, smart wearable devices, laptop computers) and/or other vehicles.

Successful and safe navigation of a vehicle depends on having accurate data measurements and representation of the external environment at all times. In particular embodiments, to maintain an accurate representation or three-dimensional model of the external environment, an optical camera may capture a picture of the external environment, and a LiDAR instrument may use a light beam to measure the distance to various objects in the external environment. An optical camera works by taking a color image profile of the environment, and the data collected can be processed to read signs, navigate along road markings, recognize moving or stationary objects relevant to the movement of the vehicle, and other important visual driving cues. Multiple optical cameras (e.g., between four to six cameras) may be used to create a three-dimensional image by image stitching the data from each of the optical cameras. A LiDAR instrument works by emitting a light beam out into the world and measuring the time it takes to return to obtain a depth profile of the environment. The return time for each return light beam is combined with the location of the LiDAR instrument to determine a precise location of a surface point of an object. This location is recorded as a three-dimensional point in space, i.e., azimuth, elevation, and range. In some LiDARs, the Doppler information from the target is acquired, providing a 4D data point. Several recorded three-dimensional points may provide an accurate three-dimensional representation of the environment surrounding the LiDAR instrument, which may be referred to as a point cloud. A LiDAR system typically includes a light source, a receiver, a mirror that rotates or tilts on a gimbal, timing electronics, a Global Positioning System (GPS), and an Inertial Measurement Unit (IMU).

Traditionally, the one or more optical cameras and the one or more LiDAR instruments are separate entities placed in proximity with one another. As such, having accurate data of a three-dimensional model of the external environment is highly dependent on proper alignment of the data collected from the vehicle's optical cameras with each other and with the data collected from the LiDAR instruments. However, when multiple cameras are used together with one or more LiDARs, each of the cameras may have a slightly different rotation and position of lenses relative to each other, and the one or more LiDARs may also be not aligned with each other or with the cameras. As such, in particular embodiments, steps must be taken to first align the vehicle's multiple optical cameras with each other, then determine whether there is misalignment between the vehicle's optical cameras and the LiDAR instruments, and if so, what degree of misalignment there is between the vehicle's optical cameras and the LiDAR instruments (e.g., 10 degrees, 20 degrees, etc.). Moreover, complex computations in processing the camera data and LiDAR data are needed to calibrate and align the received image profiles with the respective depth profiles.

In particular embodiments, a camera and LiDAR calibration system may be constructed that uses a vehicle turntable to rotate a vehicle around a plurality of calibration surfaces each with a plurality of positional markers surrounding the vehicle to generate a three-dimensional (3D) point cloud used to calibrate the cameras and LiDAR to be aligned with each other. Because cameras typically have higher resolution than LiDAR, for example, a camera sensor collecting data from 1000 pixels is more accurate than a LiDAR sensor collecting data for six beams of light, a plurality of cameras sensors may be calibrated with each other first before calibrating the LiDAR sensors to the camera sensors. For this process, the plurality of cameras may be configured to capture images of the positional markers on the calibration surfaces, and then this camera data may be processed using bundle adjustment to generate coordinates of the 3D positions of every positional marker in three-dimensional space in relation to the position of the cameras for a camera 3D point cloud. At the same time, the LiDAR may be configured to capture a plurality of distances to the positional markers on the calibration surfaces to generate a LiDAR 3D point cloud of the positions of every positional marker in three-dimensional space in relation to the position of the LiDAR. Then, the camera 3D point cloud is processed together with the LiDAR 3D point cloud to optimize the LiDAR position and/or rotation to match the camera positioning so that the data collected from the LiDAR is aligned with all of the plurality of cameras. As a result, after this calibration process, the cameras are aligned with the LiDAR when processing and using data collected from the environment to help guide and navigate the vehicle.

Alternatively, in particular embodiments, the process may include calibrating all the cameras with one LiDAR first (e.g., calibrating a first camera to a first LiDAR, then a second camera to the first LiDAR, then a third camera to the first LiDAR, etc.), and then calibrating the LiDARs with each other (e.g., calibrating a first LiDAR with a second LiDAR, then calibrating the first LiDAR with a third LiDAR, etc.). This process may have the advantage of constructing a process that is easier to debug since the calibration of each individual camera with a LiDAR can be checked and verified before moving onto the next camera.

The process may start with an initial estimate of the alignment of each of the one or more cameras with a particular LiDAR (e.g., a top LiDAR used as a reference LiDAR that overlaps with all the other cameras and LiDARs) that is determined based on a model (e.g., a CAD model), which can provide a coarse estimate of the camera to LiDAR pose for a camera-LiDAR pair. Both a first camera and the top LiDAR collect images of the calibration surfaces (e.g., the plurality of calibration surfaces each with the plurality of positional markers surrounding the vehicle discussed above) to generate the first camera 3D point cloud and a top LiDAR 3D point cloud, and then the initial estimate of the alignment may be used to segment the LiDAR point cloud by filtering out LiDAR points collected by the top LiDAR that are not within the surface of the calibration surfaces. Then, using the first camera 3D point cloud and the segmented top LiDAR 3D point cloud, the alignment between the first camera and the top LiDAR (e.g., the lidar-from-camera transformation) is determined by minimizing the point-to-plane distance cost. This alignment is then used to calibrate the positioning of the first camera relative to the top LiDAR. Once this is complete, the process then moves onto calibrating a second camera relative to the top LiDAR, and then a third camera relative to the top LiDAR, until all cameras are calibrated with the top LiDAR.

After all cameras are calibrated with the top LiDAR, the process then moves onto calibrating the top LiDAR with the remaining LiDARs of the system. This process may start with determining a segmented LiDAR point cloud for a first LiDAR (e.g., a LiDAR different from the top LiDAR that may not overlap with some or all of the other cameras and LiDARs), and then aligning the segmented top LiDAR point cloud with a segmented first LiDAR point cloud by using a similar minimization of the point-to-plane distance cost discussed above. This alignment is then used to calibrate the positioning of the first LiDAR relative to the top LiDAR. Once this is complete, the process then moves onto calibrating a second LiDAR relative to the top LiDAR, then a third LiDAR relative to the top LiDAR, until all LiDARs are calibrated with the top LiDAR. In particular embodiments, both the camera-LiDAR calibration process, and the LiDAR-LiDAR calibration process requires the use of at least three calibration surfaces that are orientated in different directions, or at least three images of the same calibration surface at different times (e.g., so that they are oriented differently relative to the camera/LiDAR) in order to determine the point-to-plane distance cost.

In particular embodiments, the cost function used for calibration may include minimizing an angle between planes (as discussed above), minimizing point-to-plane distances (as discussed above), in addition to other relevant cost functions. As an example, another cost function may include a minimizing based on point-to-target cost function that penalizes points which are close to an infinite plane a target surface lies on, but outside an edge of a physical target (e.g., a calibration surface target).

The advantages of using the camera and LiDAR calibration system disclosed herein includes having a simple system for calibration or recalibration the LiDAR sensors with the camera sensors in which both camera and LiDAR data are collected concurrently to be used for the calibration process. As an example, this system may allow a vehicle (e.g., an autonomous vehicle) to drive onto the rotatable turntable of the system and be rotated around to collect both image data via the camera sensor and depth profile data via the LiDAR sensors as the vehicle is shifted by a predetermined angle between each collection of camera and LiDAR data, and then the camera and LiDAR data are processed to determine how much one or more of the LiDAR sensors would need to be rotated relative to the camera sensors in order to achieve alignment between the camera and LiDAR sensors for collecting and processing data collected from the environment to help guide and navigate the vehicle. In addition, the vehicle may receive instructions directly from a transportation management system to travel to a location to use the camera and LiDAR calibration system when it is determined that the calibration between the camera sensors and LiDAR sensor is not aligned or no longer aligned. This determination may be made by the vehicle itself, the transportation management system, or any other suitable entity associated with the vehicle.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1 illustrates an example configuration of a camera and LiDAR position calibration system with two calibration objects surrounding an autonomous vehicle. In particular embodiments, the camera and LiDAR position calibration system 100 includes a vehicle 110 (e.g., an autonomous vehicle) with camera sensors and LiDAR sensors, a rotatable turntable 120 that the vehicle 110 is positioned on, and one or more calibration surfaces 130, 140. The vehicle 100 may have at least three camera sensors pointing in different directions, and at least one LiDAR sensor. The turntable 120 may move the vehicle in a clockwise or counterclockwise direction as the camera sensors capture images of calibration surfaces 130, 140, and the LiDAR sensor captures a depth profile (e.g., distance in 3D space) to the calibration surfaces 130, 140. The calibration surfaces 130, 140 include a plurality of unique positional markers that can be used to detect a 3D position of the positional markers in 3D space, as discussed in more detail below in relation to FIGS. 3A-3C and 4A-4C.

In particular embodiments, the plurality of unique positional markers (e.g., ArUco markers, 2D markers, QR codes, or any other relevant markers) on calibration surfaces 130, 140 may each encode a unique identifier so that each snapshot taken by the camera sensors can be processed to detect what the unique identifier is and where the unique identifier is located in 3D space, as discussed in more detail below. To calibrate the plurality of camera sensors with each other or with a particular LiDAR in view of the multiple camera sensors and the different directions that each camera sensor is pointing, the vehicle 110 is rotated on turntable 120 by a predetermined degree to capture a plurality of images of unique positional markers in the environment at each rotational position (e.g., rotating turntable 120 by 15 degrees per image). A predetermined number of images is captured (e.g., 20 images) based on the number of cameras so that enough camera data of the plurality of unique positional markers is collected to determine position, rotation, and other intrinsic factors of the cameras sensors.

In particular embodiments, the camera and LiDAR position calibration system 100 may interact with, receive executable instructions from, and send calibration data to a transportation management environment 900 (discussed in more detail below with regard to FIG. 9), such as in the situation where the vehicle is directed to travel to a location to use the camera and LiDAR calibration system when it is determined that the calibration between the camera sensors and LiDAR sensor is not aligned or no longer aligned.

Figure 2A:
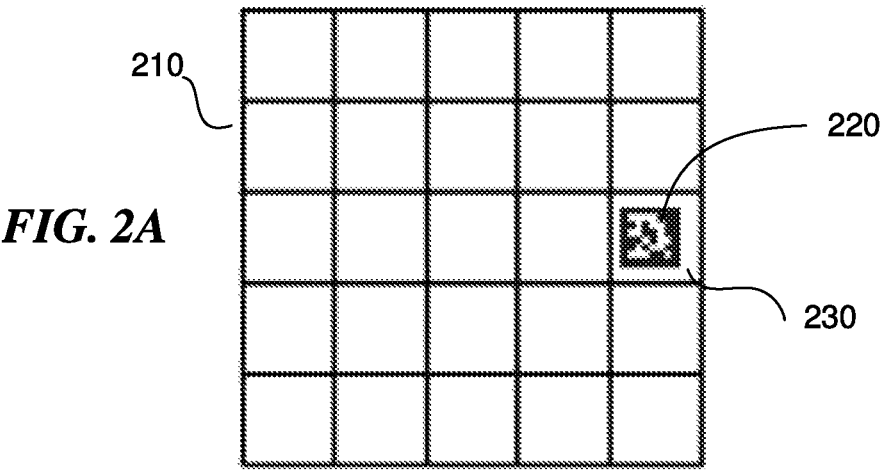
FIGS. 2A-2C illustrates the movement of a positional marker on a calibration surface as seen from the vehicle during calibration using the camera and LiDAR position calibration system.
Figure 2B:
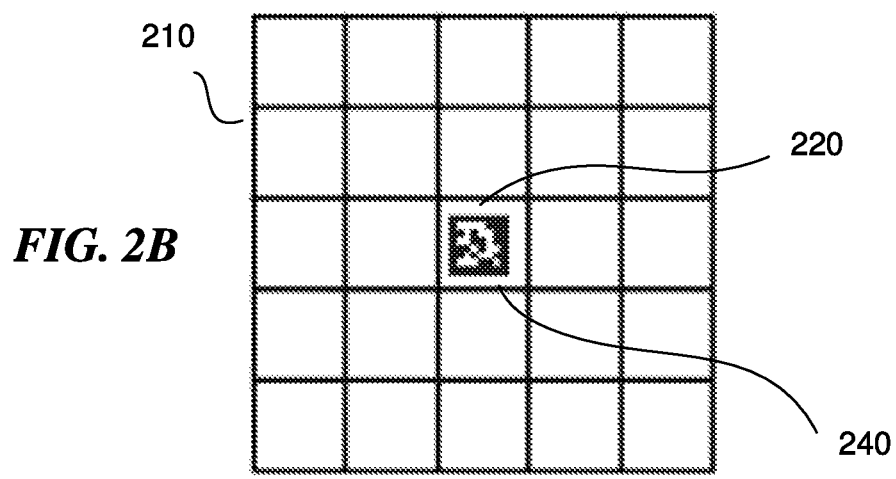
Figure 2C:
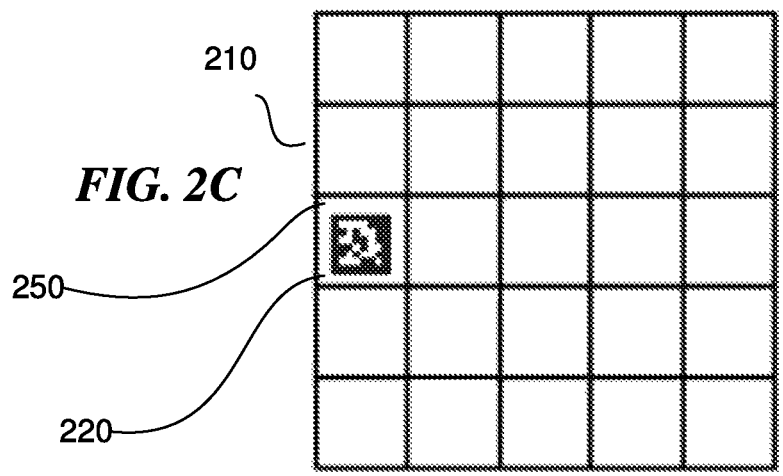

FIGS. 2A-2C illustrates the movement of a positional marker on a calibration surface as seen from the vehicle during calibration using the camera and LiDAR position calibration system. In particular embodiments, the calibration surfaces are planar and non-moving during the image capturing. As shown in FIG. 2A, grid 210 illustrates a five-by-five-pixel grid of an image, and as captured in a first image by the camera sensors, unique positional marker 220 is located in pixel 230 of pixel grid 210. Then, as shown in FIG. 2B, as turntable 120 is rotated by a predetermined angle to capture a second image, unique positional marker 220 is now located at pixel 240 of pixel grid 210. Then, as shown in FIG. 2C, as turntable 120 is further rotated by a subsequence predetermined angle to capture a third image, unique positional marker 220 is now located at pixel 250 of pixel grid 210. Then, as turntable 120 is further rotated, additional images are captured, with a result of a plurality of captured images showing the unique identity and position of unique positional marker 220 for each of the plurality of camera sensors. This camera data may then be processed using a bundle adjustment algorithm to calculate the intrinsic characteristics of each of the camera sensors and calibrate the position, rotation, and other intrinsic characteristics of each of the camera sensors with the other camera sensors. In addition, following bundle adjustment, each camera sensor may generate a 3D map of the 3D position (e.g., including x, y, and z axis coordinates) of each of the unique positional markers on each of the calibration surfaces 130, 140 to create a camera 3D point cloud.

Figure 3A:
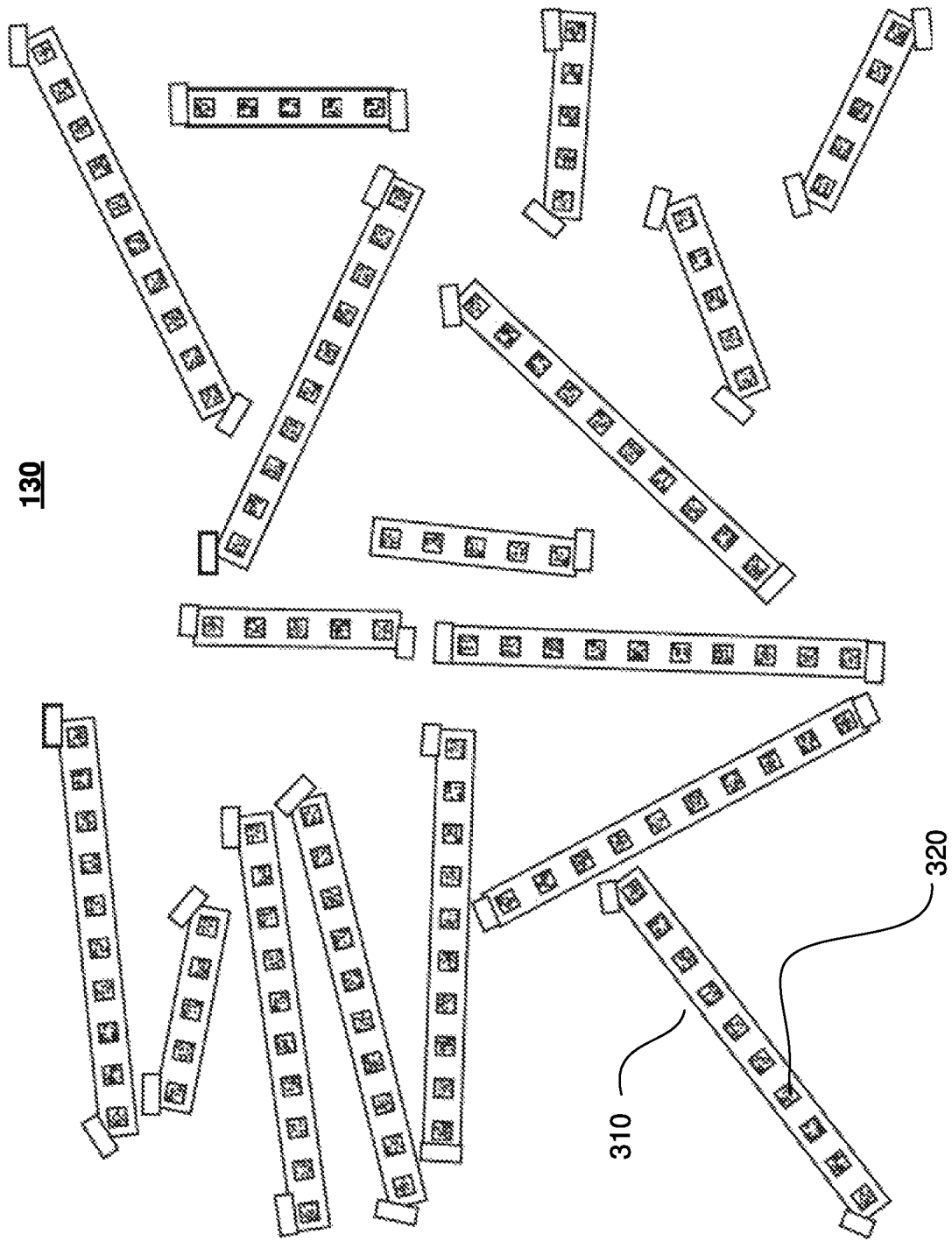
FIGS. 3A-3C illustrate generating a camera 3D point cloud and a LiDAR 3D point cloud using the camera and LiDAR position calibration system.
Figure 3B:
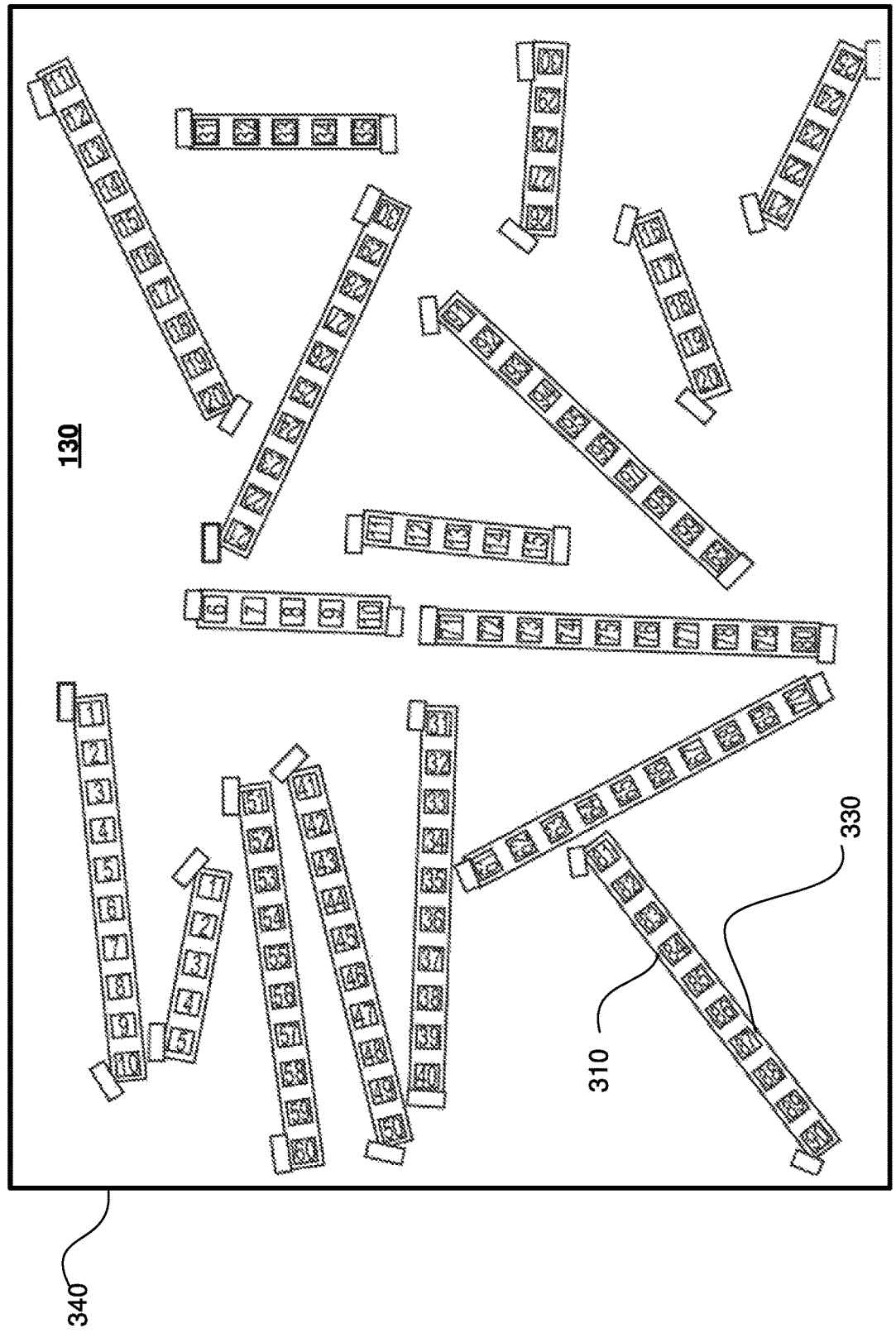
Figure 3C:
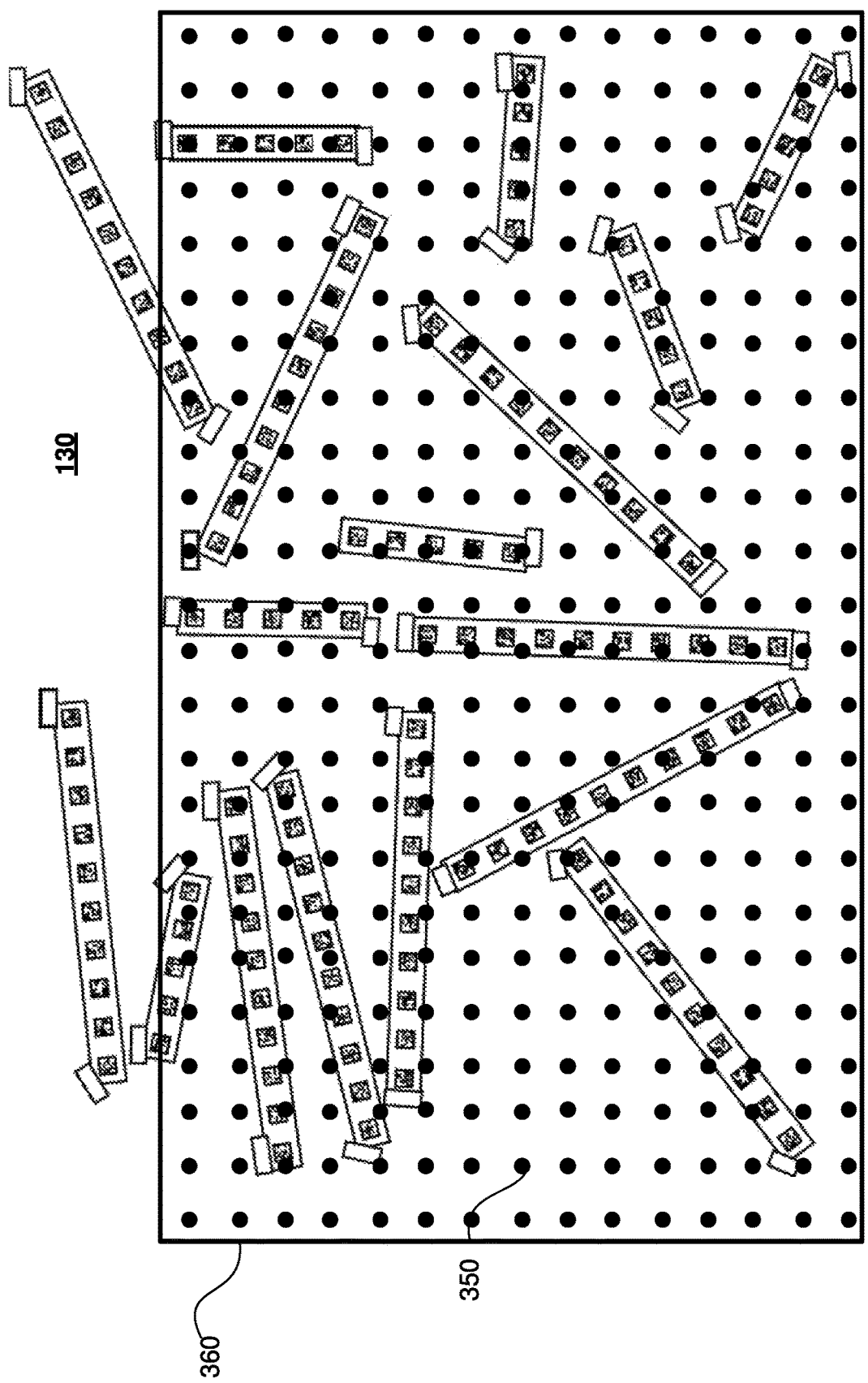

Generating the camera 3D point cloud and the LiDAR 3D point cloud is now discussed in more detail using specific examples of each of the calibration surfaces 130 and 140. FIGS. 3A-3C illustrate generating a camera 3D point cloud and a LiDAR 3D point cloud using the camera and LiDAR position calibration system for calibration surface 130. As shown in FIG. 3A, calibration surface 130 may include a plurality of columns 310 of unique positional markers 320. Columns 310 are positioned in a plurality of different directions, and each column 310 includes a variable number of unique positional marker 320. As discussed above, each unique positional marker 320 may include an ArUco marker, which are small 2D barcodes. Each ArUco marker corresponds to a number, encoded into a small grid of black and white pixels. ArUco markers are useful for camera sensor processing because an ArUco decoding algorithm may be used with the ArUco markers for locating, decoding, and of estimating the pose (location and orientation in space) of any ArUco markers in the camera's field of view.

As shown in FIG. 3B, each ArUco marker may be decoded by the ArUco decoding algorithm to correspond to a unique number. As an example and not by way of limitation, decoded ArUco marker 330, which corresponds to unique positional marker 320 of column 310, corresponds to the number "87." In decoding all the unique positional markers to numbers, and after the camera sensors have been calibrated with each other or when each camera is being calibrated with a particular LiDAR (as discussed above), the camera sensors can process the image data of the plurality of columns 310 of the decoded ArUco markers 330 to generate a 3D map of the 3D position (e.g., including x, y, and z axis coordinates) of each of the unique positional markers on the calibration surface 130 to create a camera 3D point cloud 340 for the calibration surface 130. This camera 3D point cloud 340 includes the 3D positions of all of the decoded ArUco markers 330 and allows the camera sensors to correlate the 3D position of each decoded ArUco markers 330 to each pixel of the 3D image of calibration surface 130 taken by the camera sensors.

In particular embodiments, the LiDAR sensors are capturing LiDAR data at the same time as the camera sensors are capturing camera data (i.e., the camera sensors and LiDAR sensors are concurrently capturing image data and depth profile data, respectively). As discussed above, the LiDAR sensor captures the amount of time it takes for a light beam from a laser to hit an object in space and reflect back, and thus LiDAR data provides information on direction and distance to the object in space. Unlike the camera sensors, the LiDAR sensors do not collect information on the unique positional markers on the calibration surface 130. Instead, as shown in FIG. 3C, the LiDAR sensor captures a depth profile comprising a plurality of 3D points 350 corresponding to a distance from the LiDAR sensor to the planar surface of the calibration surface 130. The plurality 3D points may then be used to generate a LiDAR 3D point cloud 360. As shown in FIG. 3C, the LiDAR 3D point cloud 360 may not necessarily encompass the entirety of calibration surface 130, and instead may only include a portion of calibration surface 130 based on the height and location of the LiDAR sensor placed on the vehicle. In particular embodiments, because the LiDAR sensor captures information on direction and distance to any and all objects in the environment, unnecessary points may be collected as part of the LiDAR 3D point cloud 360 that are irrelevant to the calibration surface 130. In addition, although the camera sensors are capturing images of objects in the environment to generate a camera 3D point cloud 340, and the LiDAR sensors are concurrently capturing a depth profile of the objects in the environment to generate a LiDAR 3D point cloud 360, the LiDAR 3D point cloud 360 may not completely overlap with the camera 3D point cloud 340 due to the misalignment issues between the camera and lidar sensors. As such, a process for filtering out irrelevant points in the LiDAR 3D point cloud 360 and then correcting the misalignment between the camera and lidar sensors is discussed in more detail below in relation to FIGS. 6A, 6B, 7, and 8.

Figure 4A:
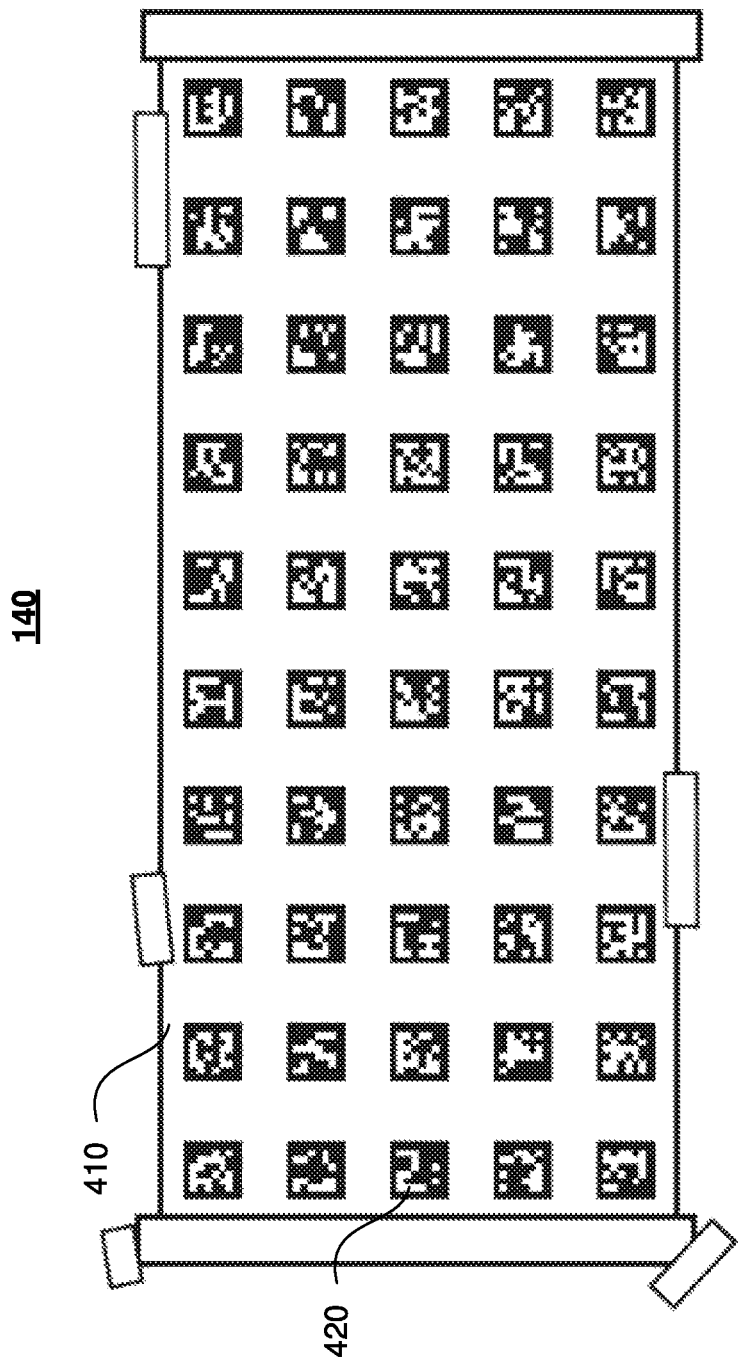
FIGS. 4A-4C illustrate another example of generating a camera 3D point cloud and a LiDAR 3D point cloud using the camera and LiDAR position calibration system.
Figure 4B:
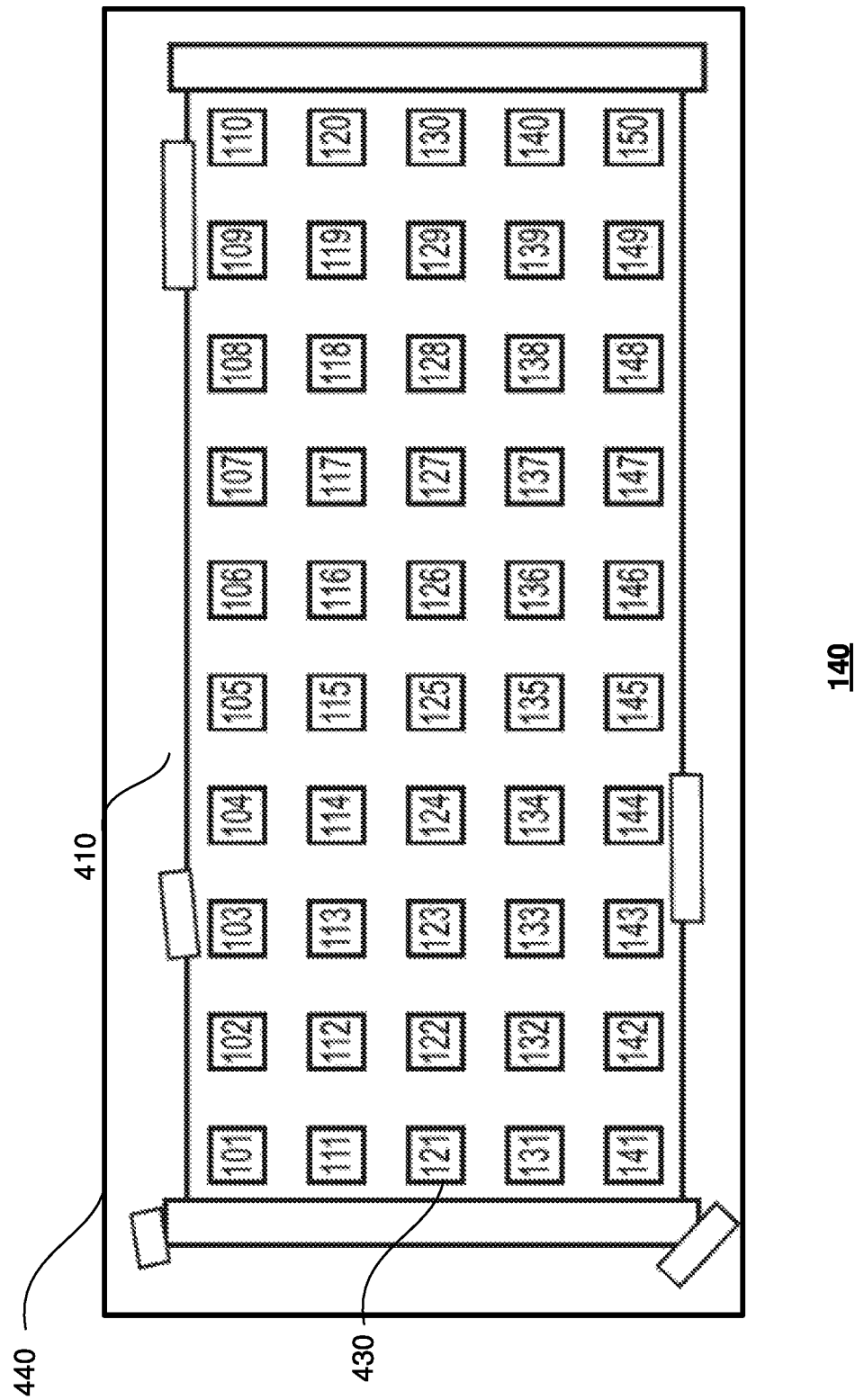
Figure 4C:
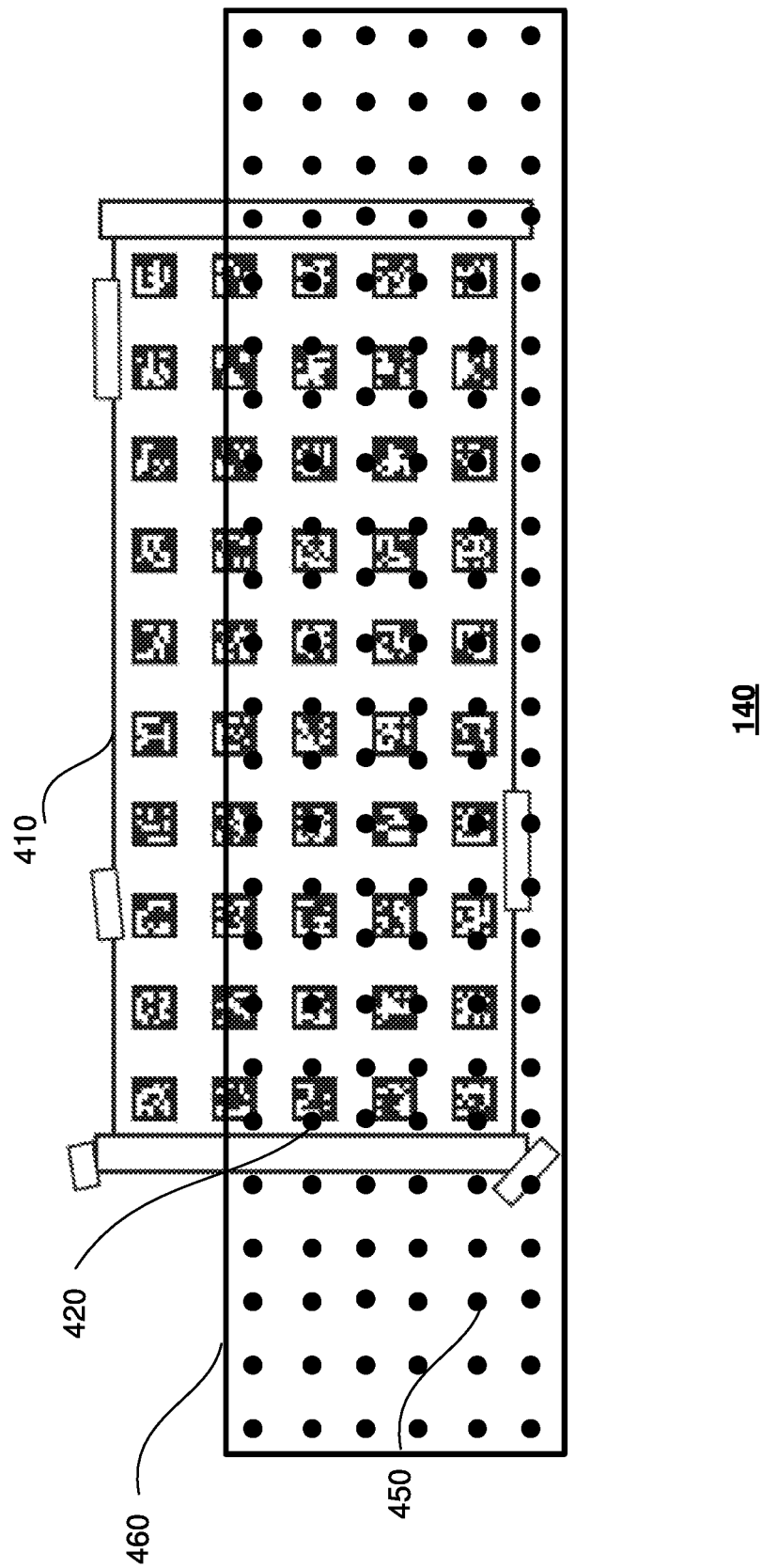

FIGS. 4A-4C illustrate generating a camera 3D point cloud and a LiDAR 3D point cloud using the camera and LiDAR position calibration system for calibration surface 140. As shown in FIG. 4A, calibration surface 140 may include a grid 410 of unique positional markers 420. The grid 410 may include a five by ten grid of unique positional markers 420, and each unique positional marker 420 may include an ArUco marker. As shown in FIG. 4B, each ArUco marker may be decoded by the ArUco decoding algorithm to correspond to a unique number. As an example and not by way of limitation, decoded ArUco marker 430, which corresponds to unique positional marker 420, corresponds to the number "121." As discussed above, in decoding all the unique positional markers to numbers, and after the camera sensors have been calibrated with each other, the camera sensors can process the image data of the grid 410 of the decoded ArUco markers 430 to generate a 3D map of the 3D position (e.g., including x, y, and z axis coordinates) of each of the unique positional markers on the calibration surface 140 to create a camera 3D point cloud 440 for the calibration surface 140. This camera 3D point cloud 440 includes the 3D positions of all of the decoded ArUco markers 430 and allows the camera sensors to correlate the 3D position of each decoded ArUco markers 430 to each pixel of the 3D image of calibration surface 140 taken by the camera sensors.

In particular embodiments, the cameras sensors and LiDAR sensors are concurrently capturing image data and depth profile data, respectively. Thus, as shown in FIG. 4C, the LiDAR sensor captures a depth profile comprising a plurality of 3D points 450 corresponding to a distance from the LiDAR sensor to the planar surface of the calibration surface 140. The plurality 3D points may then be used to generate a LiDAR 3D point cloud 460. As shown in FIG. 4C, the LiDAR 3D point cloud 460 may not necessarily encompass the entirety of calibration surface 140, and instead may only include a portion of calibration surface 140 based on the height and location of the LiDAR sensor placed on the vehicle. In addition, because the LiDAR sensor captures information on direction and distance to any and all objects in the environment, unnecessary points such as points extending beyond calibration surface 140 may be collected as part of the LiDAR 3D point cloud 460 that are irrelevant to the calibration surface 140. The process for filtering out irrelevant points in the LiDAR 3D point cloud 360 and then correcting the misalignment between the camera and lidar sensors is discussed in more detail below in relation to FIGS. 6A, 6B, 7, and 8 below.

Figure 5:
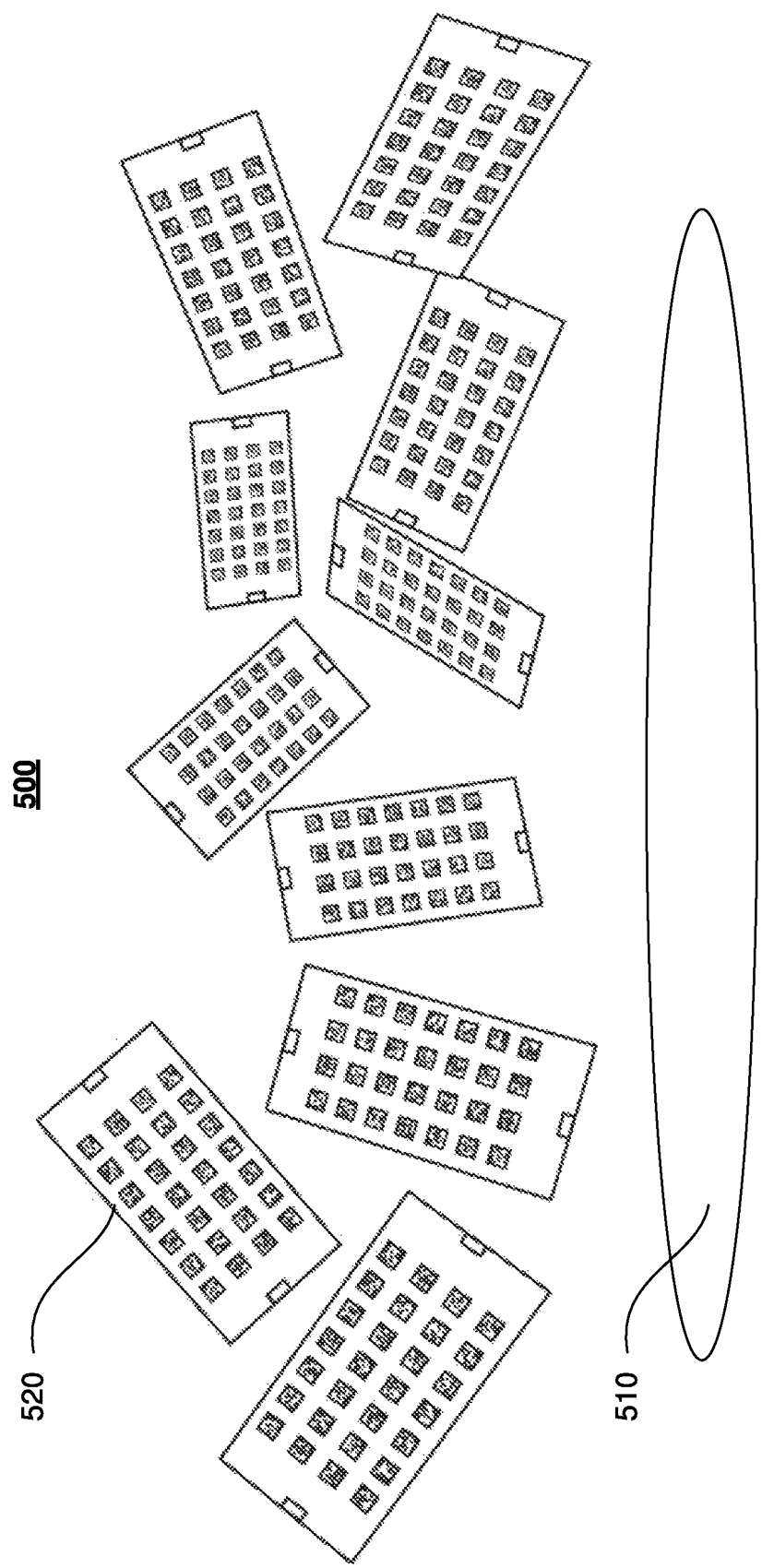
FIG. 5 illustrates another example configuration of a camera and LiDAR position calibration system with multiple calibration surfaces surrounding a vehicle.

FIG. 5 illustrates another example configuration of a camera and LiDAR position calibration system with multiple calibration surfaces surrounding a vehicle. In particular embodiments, a camera and LiDAR position calibration system 500 includes a turntable 510 that a vehicle (not shown) may be placed on, and a plurality of calibration surfaces 520. Specifically, this embodiment includes ten calibration surfaces 520, and as shown in FIG. 5, these calibration surfaces 520 all include planar surfaces that are placed at different angles in relation to the position of the vehicle on the turntable 510. As discussed above, both the camera-LiDAR calibration process, and the LiDAR-LiDAR calibration process requires the use of at least three calibration surfaces that are orientated in different directions, or at least three images of the same calibration surface at different times (e.g., so that they are oriented differently relative to the camera/LiDAR) in order to determine the point-to-plane distance cost. The turntable 510 may move the vehicle in a clockwise or counterclockwise direction as the camera sensors capture images of calibration surfaces 520, and the LiDAR sensor captures a depth profile (e.g., distance in 3D space) to the calibration surfaces 520. Similar to the embodiment shown in FIG. 1, the calibration surfaces 520 shown in FIG. 5 may include a plurality of unique positional markers that can be used to detect a 3D position of the positional markers in 3D space.

Figure 6A:
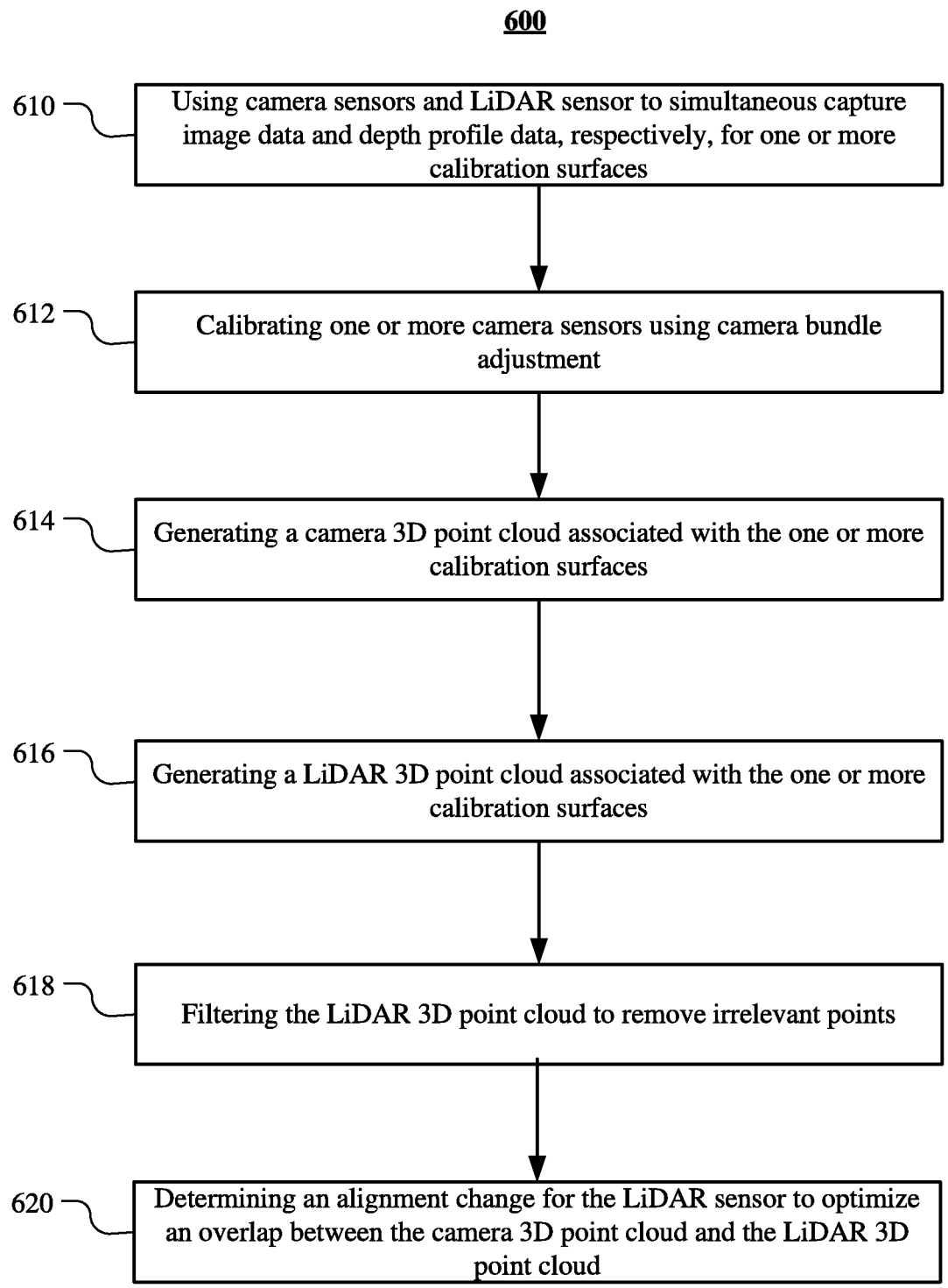
FIG. 6A illustrates a method of a method for calibrating the cameras and LiDAR for vehicle guidance and navigation.
Figure 6B:
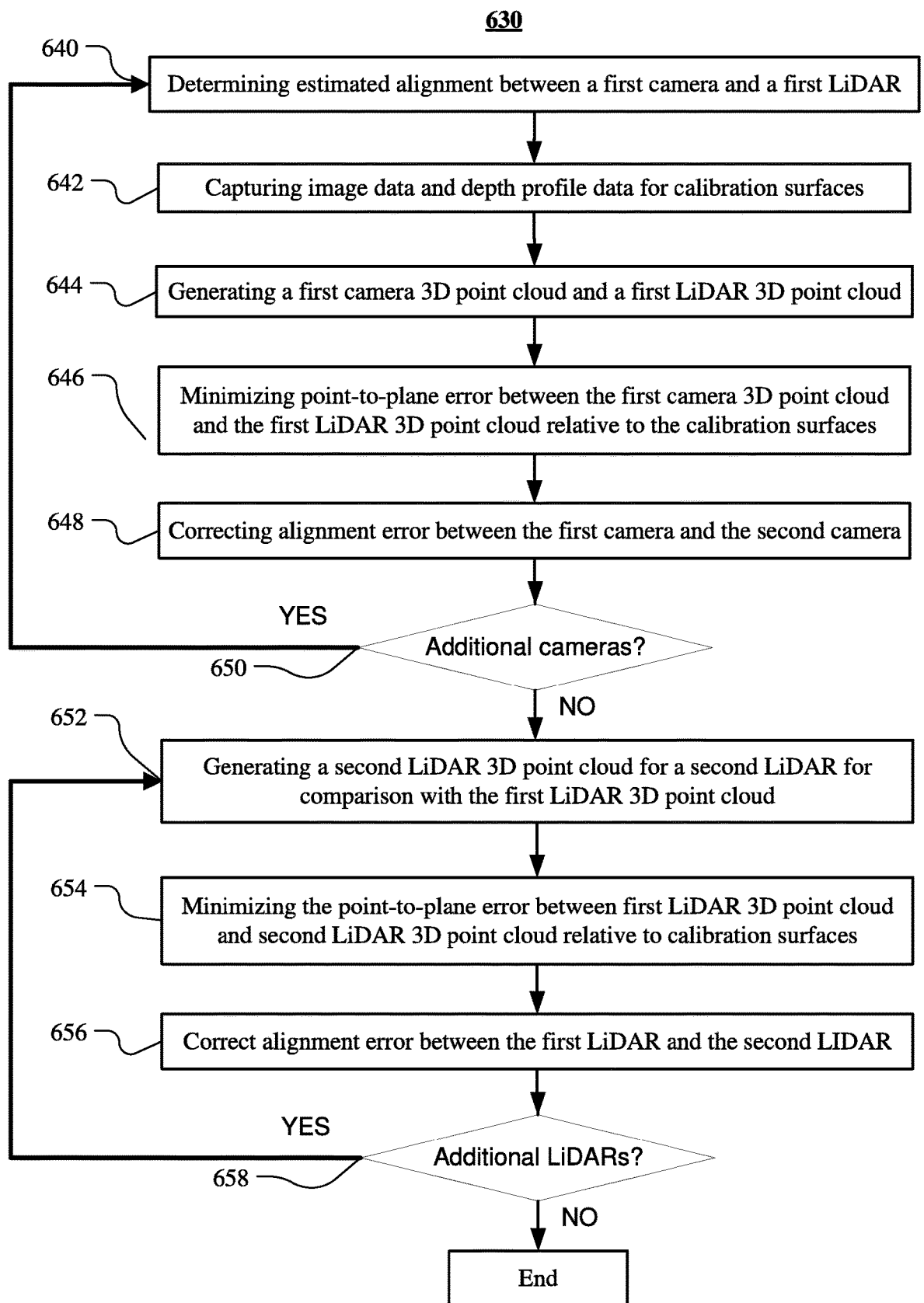
FIG. 6B illustrates an alternative method of a method for calibrating the cameras and LiDAR for vehicle guidance and navigation.

FIG. 6A illustrates an example method 600 for a method for calibrating the cameras and LiDAR for vehicle guidance and navigation. This process may include first calibrating all the cameras with each other before calibrating the LiDARs with the cameras. FIG. 6B, described below, illustrates an alternative method for calibrating the cameras and LiDARs for vehicle guidance and navigation. The method may begin at step 610, where the camera and LiDAR position calibration system 100 may use the camera sensors and LiDAR sensor to simultaneous capture image data and depth profile data, respectively, for one or more calibration surfaces (as discussed above in relation to FIGS. 1 and 2A-2C). Then, at step 612, the camera and LiDAR position calibration system 100 may calibrate one or more camera sensors using camera bundle adjustment. As discussed above, to calibrate the plurality of camera sensors with each other in view of the multiple camera sensors and the different directions that each camera sensor is pointing, the vehicle 110 is rotated on turntable 120 by a predetermined degree to capture a plurality of images of unique positional markers in the environment at each rotational position (e.g., rotating turntable 120 by 15 degrees per image). A predetermined number of images is captured (e.g., 20 images) based on the number of cameras so that enough camera data of the plurality of unique positional markers is collected to determine position and rotation of the cameras sensors. This camera data may then be processed using a bundle adjustment algorithm to calculate the intrinsic characteristics of each of the camera sensors and calibrate the position, rotation, and other intrinsic characteristics of each of the camera sensors with the other camera sensors.

At step 614, the camera and LiDAR position calibration system 100 may generate a camera 3D point cloud associated with the one or more calibration surfaces. Following bundle adjustment, each camera sensor may generate a 3D map of the 3D position (e.g., including x, y, and z axis coordinates) of each of the unique positional markers on each of the calibration surfaces (e.g., calibration surfaces 130, 140) to create a camera 3D point cloud. As discussed above regarding FIGS. 3A and 3B, calibration surface 130 may include a plurality of columns 310 of unique positional markers 320, and each unique positional marker 320 may include an ArUco marker. In decoding all the unique positional markers to numbers, the camera sensors can process the image data of the plurality of columns 310 of the decoded ArUco markers 330 to generate a 3D map of the 3D position (e.g., including x, y, and z axis coordinates) of each of the unique positional markers on the calibration surface 130 to create a camera 3D point cloud 340 for the calibration surface 130. This camera 3D point cloud 340 includes the 3D positions of all of the decoded ArUco markers 330 and allows the camera sensors to correlate the 3D position of each decoded ArUco marker 330 to each pixel of the 3D image of calibration surface 130 taken by the camera sensors.

At step 616, the camera and LiDAR position calibration system 100 may generate a LiDAR 3D point cloud associated with the one or more calibration surfaces. As discussed above regarding FIG. 3C, the LiDAR sensor captures a depth profile comprising a plurality of 3D points 350 corresponding to a distance from the LiDAR sensor to the planar surface of the calibration surface 130. The plurality 3D points may then be used to generate a LiDAR 3D point cloud 360. However, because the LiDAR sensor captures information on direction and distance to any and all objects in the environment, unnecessary points may be collected as part of the LiDAR 3D point cloud 360 that are irrelevant to the calibration surface 130. In addition, although the camera sensors are capturing images of objects in the environment to generate a camera 3D point cloud 340, and the LiDAR sensors are concurrently capturing a depth profile of the objects in the environment to generate a LiDAR 3D point cloud 360, the LiDAR 3D point cloud 360 may not completely align or overlap with the camera 3D point cloud 340 due to the misalignment issues between the camera and lidar sensors.

Figure 7:
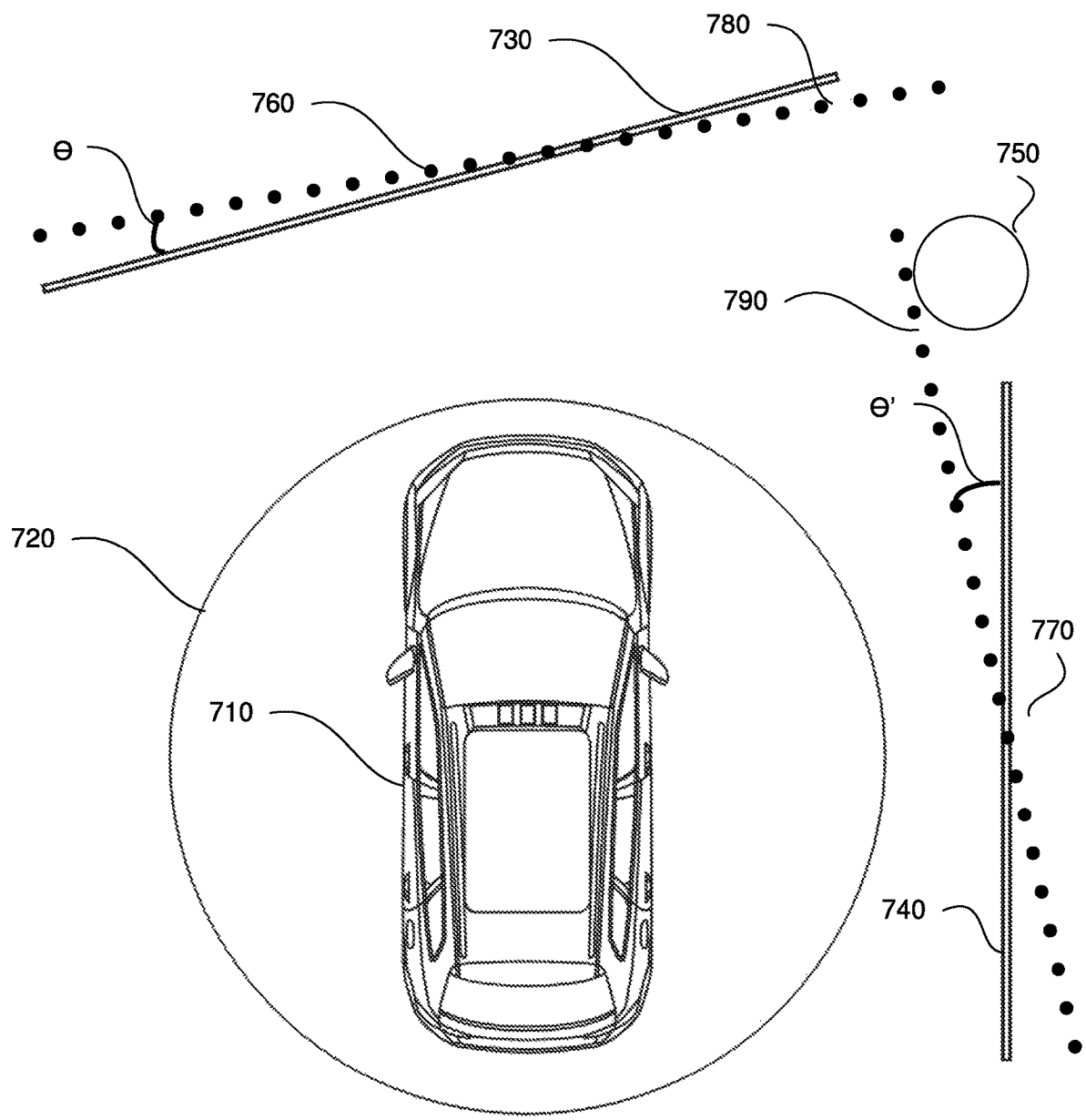
FIG. 7 illustrates a perspective view of the camera and LiDAR position calibration system showing the planes of the camera and LiDAR point clouds prior to calibration of the LiDAR sensor.

As an example, FIG. 7 illustrates a perspective view of the camera and LiDAR position calibration system showing the planes of the camera and LiDAR point clouds prior to calibration of the LiDAR sensor. As shown in FIG. 7, vehicle 710 is positioned on rotatable turntable 720, and surrounding the vehicle 710 are first calibration surface 730, second calibration surface 740, and object 750. Following steps 610 to 616, system 100 may use the camera sensors and LiDAR sensor to simultaneously capture image data and depth profile data, respectively, for calibration surfaces 730, 740, calibrate one or more camera sensors using camera bundle adjustment, and generate a camera 3D point cloud associated with each of the calibration surfaces 730, 740, and also generate a LiDAR 3D point cloud associated with each of the calibration surfaces 730, 740. A plane 760 generated from camera 3D point cloud of the first calibration surface 730 (e.g., a best-fit plane) corresponds to the plane of the first calibration surface 730, and a plane 770 generate from camera 3D point cloud of the second calibration surface 740 (e.g., a best-fit plane) corresponds to the plane of the second calibration surface 740. However, as shown in FIG. 7, a plane 780 generated from the LiDAR 3D point cloud associated with the first calibration surface 730 (e.g., a best-fit plane) does not align with the first calibration surface 730, and in fact the alignment is off by a (non-zero) 3D angle denoted θ. In addition, the LiDAR 3D point cloud associated with the first calibration surface 730 extends beyond the width of the first calibration surface 730 by a portion 780. Similarly, a plane 790 generate from the LiDAR 3D point cloud associated with the second calibration surface 740 (e.g., a best-fit plane) does not align with the second calibration surface 740, and specifically the alignment is off by a (non-zero) 3D angle denoted θ'. In particular embodiments, θ may equal or substantially equal θ'. In addition, due to the presence of object 750, the LiDAR 3D point cloud associated with the second calibration surface 740 extends beyond the width of the second calibration surface 740 by a portion 790. As such, the portions 780 and 790 are irrelevant points that may be filtered prior to determining a degree of alignment change of the LiDAR sensor relative to the camera sensors.

Back to FIG. 6A, at step 618, the camera and LiDAR position calibration system 100 may filter the LiDAR 3D point cloud to remove irrelevant points prior to correcting the misalignment between the camera and lidar sensors. In particular embodiments, the filtering may be accomplished by first generating a plane based on the camera 3D point cloud (e.g., a best-fit plane), and then determining, for each point on the LiDAR 3D point cloud, a distance of the point to the plane generated based on the camera 3D point cloud. If it is determined that the distance of any of the points on the LiDAR 3D point cloud are more than a threshold distance from the plane generated based on the camera 3D point cloud, these points are determined to be irrelevant points and thus removed from the LiDAR 3D point cloud. In particular embodiments, the filtering may also be accomplished by first generating a plane based on the LiDAR 3D point cloud (e.g., a best-fit plane), and then determining a distance between one point on the LiDAR 3D point cloud and its nearest neighboring point on the LiDAR 3D point cloud. If it is determined that the distance between the two neighboring points of the LiDAR 3D point cloud is greater than a threshold distance apart, then the point on the LiDAR 3D point cloud that is located at a distance furthest away from the plane generated based on the LiDAR 3D point cloud is determined to be irrelevant points and thus removed from the LiDAR 3D point cloud. This second method is particularly useful for removing irrelevant points that arise from objects that are located close to a calibration surface but are separate entities from the calibration surface (e.g. object 750 in FIG. 7). The result of these filtering techniques is to keep only points on the LiDAR 3D point cloud that are relevant to the calibration surfaces.

In particular embodiments, the above-discussed method for filtering irrelevant points using the nearest neighboring points typically works for arbitrary configurations of markers on a calibration surface (e.g., as shown in FIG. 3B). An alternative embodiment includes a method that works for targets (e.g., calibration surfaces) in which the precise location of every calibration marker is known (e.g., using xyz coordinates), and the exact boundaries of the calibration surfaces are also known (e.g., also using xyz coordinates). In this embodiment, a candidate LiDAR point of the LiDAR 3D point cloud may be expressed in the coordinate system of the calibration surface such that, in this xyz coordinate system, the z coordinate is the distance to the calibration surface. Thus, in order to filter irrelevant points, this method can simply determine whether the z coordinate associated with a particular point is within the limit defined by the z coordinates of the calibration surface, and also whether the xy coordinates of associated with the particular point are within the xy coordinates of the calibration surface to be located on and within the boundaries of the calibration surface.

Back to FIG. 6A, at step 620, the camera and LiDAR position calibration system 100 may determine an alignment change for the LiDAR sensor to optimize an overlap between a plane of the camera 3D point cloud and a plane of the LiDAR 3D point cloud by minimizing the 3D angle of rotation between these two planes. In other words, the camera and LiDAR position calibration system 100 may determine a way to calibrate the LiDAR sensor to align with the camera sensors such that both θ and θ' are close to or equal to zero. In particular embodiments, optimizing an overlap between the plane of the camera 3D point cloud and the plane of the LiDAR 3D point cloud may be accomplished by calculating a first normal vector perpendicular to the plane of the camera 3D point cloud and calculating a second normal vector perpendicular to the plane of the LIDAR 3D point cloud, and then determining the 3D angle of rotation based on aligning the first normal vector with the second normal vector. Alternatively, in particular embodiments, optimizing an overlap between the plane of the camera 3D point cloud and the plane of the LiDAR 3D point cloud may be accomplished by calculating the distance between each of the points of the LiDAR 3D point cloud with the plane of the camera 3D point cloud, and then minimizing these distances to achieve alignment between the plane of the camera 3D point cloud and the plane of the LiDAR 3D point cloud.

Figure 8:
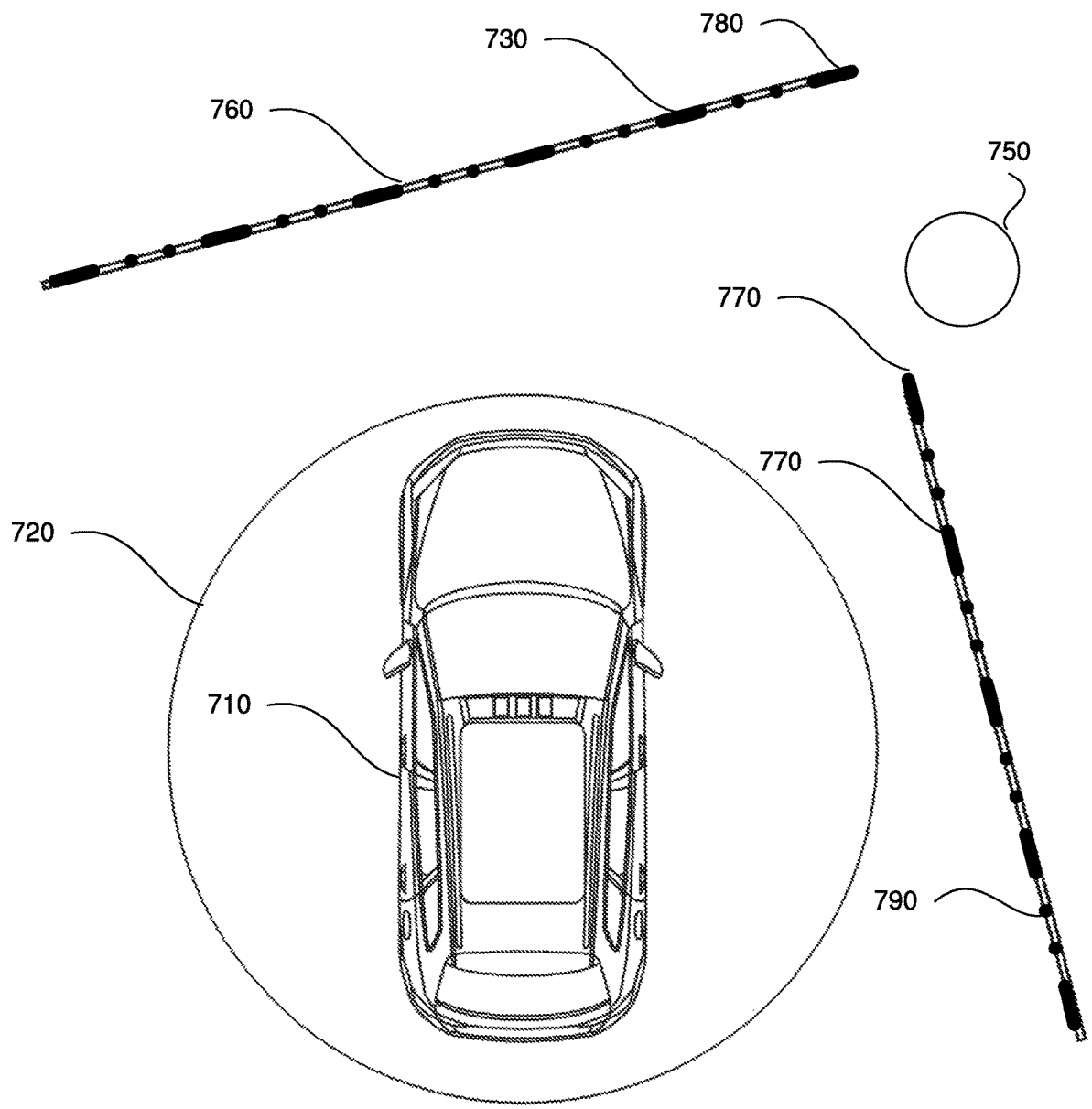
FIG. 8 illustrates a perspective view of the camera and LiDAR position calibration system showing the planes of the camera and LiDAR point clouds after calibration of the LiDAR sensor.

As an example, FIG. 8 illustrates a perspective view of the camera and LiDAR position calibration system showing the planes of the camera and LiDAR point clouds after calibration of the LiDAR sensor. As shown in FIG. 8, vehicle 710 is positioned on rotatable turntable 720, and surrounding the vehicle 710 are first calibration surface 730, second calibration surface 740, and object 750. After step 650 of filtering out irrelevant points of the LiDAR 3D point cloud and step 660 of rotating the LiDAR sensor to change the alignment to overlap the plane of the camera 3D point cloud with the plane of the LiDAR 3D point cloud with a zero or substantially zero angle between the two planes, plane 780 generated from the LiDAR 3D point cloud associated with the first calibration surface 730 is substantially aligned with plane 760 generated from camera 3D point cloud of the first calibration surface 730. In addition, plane 790 generated from the LiDAR 3D point cloud associated with the second calibration surface 740 is substantially aligned with plane 770 generated from camera 3D point cloud of the second calibration surface 740.

FIG. 6B illustrates an alternative method for calibrating the cameras and LiDARs for vehicle guidance and navigation. This process may include calibrating all the cameras with one LiDAR first (e.g., calibrating a first camera to a first LiDAR, then a second camera to the first LiDAR, then a third camera to the first LiDAR, etc.), and then calibrating the LiDARs with each other (e.g., calibrating a first LiDAR with a second LiDAR, then calibrating the first LiDAR with a third LiDAR, etc.). The method may begin at step 640, where the camera and LiDAR position calibration system 100 may determine an estimated alignment between a first camera and a first LiDAR. As discussed above, the process may start with an initial estimate of the alignment of each of the one or more cameras with a particular LiDAR (e.g., a top LiDAR used as a reference LiDAR that overlaps with all the other cameras and LiDARs) that is determined based on a model (e.g., a CAD model), which can provide a course estimate of the camera to LiDAR pose for a camera-LiDAR pair. This initial estimate of the alignment may be used to segment the LiDAR point cloud by filtering out LiDAR points collected by the top LiDAR that are not within the surface of the calibration surfaces.

Then, at step 642, the camera and LiDAR position calibration system 100 may use a first camera sensor and a first LiDAR sensor to simultaneously capture image data and depth profile data, respectively, for one or more calibration surfaces (as discussed above in relation to FIGS. 1 and 2A-2C). Then, at step 644, for the first camera and the first LiDAR, the camera and LiDAR position calibration system 100 may generate a first camera 3D point cloud and a first LiDAR 3D point cloud (as discussed above in relation to FIG. 7). Then, at step 646, the camera and LiDAR position calibration system 100 may minimize point-to-plane error between the first camera 3D point cloud and the first LiDAR 3D point cloud relative to the calibration surfaces (as discussed above in relation to FIGS. 7 and 8). Then, at step 648, the camera and LiDAR position calibration system 100 may correct any alignment error between the first camera and the second camera. Once this process is complete for the first camera, at step 650, the camera and LiDAR position calibration system 100 may determine whether there are additional cameras in the system. If the determination at step 650 is YES (e.g., there are additional cameras in the system), then the method proceeds back to step 640 to repeat steps 640 to 650.

As discussed above, after all cameras are calibrated with the top LiDAR, the process then moves onto calibrating the top LiDAR with the remaining LiDARs of the system. This process may start with determining a segmented LiDAR point cloud for a first LiDAR (e.g., a LiDAR different from the top LiDAR that may not overlap with some or all of the other cameras and LiDARs), and then aligning the segmented top LiDAR point could with a segmented first LiDAR point cloud by using a similar minimization of the point-to-plane distance cost discussed above. Going back to FIG. 6B, once the determination at step 650 is NO (e.g., there are no additional cameras in the system), then the method then moves on to step 652 where the camera and LiDAR position calibration system 100 may generate a second LiDAR 3D point cloud for a second LiDAR for comparison with the first LiDAR 3D point cloud. Then, at step 654, the camera and LiDAR position calibration system 100 may minimize the point-to-plane error between the first LiDAR 3D point cloud and the second LiDAR 3D point cloud relative to the calibration surfaces. Then, at step 656, the camera and LiDAR position calibration system 100 may correct any alignment error between the first LiDAR and the second LIDAR. At step 658, the camera and LiDAR position calibration system 100 may determine whether there are additional LiDARs in the system. If the determination at step 658 is YES (e.g., there are additional LiDARs in the system), then the method proceeds back to step 652 to repeat steps 652 to 658. If the determination at step 658 is NO (e.g., there are no additional LiDARs in the system), then the method ends.

Particular embodiments may repeat one or more steps of the methods of FIGS. 6A and 6B, where appropriate. Although this disclosure describes and illustrates particular steps of the methods of FIGS. 6A and 6B as occurring in a particular order, this disclosure contemplates any suitable steps of the methods of FIGS. 6A and 6B occurring in any suitable order. Moreover, although this disclosure describes and illustrates an example method for calibrating the cameras and LiDAR for vehicle guidance and navigation including the particular steps of the methods of FIGS. 6A and 6B, this disclosure contemplates any suitable method for calibrating the cameras and LiDAR for vehicle guidance and navigation including any suitable steps, which may include all, some, or none of the steps of the methods of FIGS. 6A and 6B, where appropriate. Furthermore, although this disclosure describes and illustrates particular components, devices, or systems carrying out particular steps of the methods of FIGS. 6A and 6B, this disclosure contemplates any suitable combination of any suitable components, devices, or systems carrying out any suitable steps of the methods of FIGS. 6A and 6B.

Figure 9:
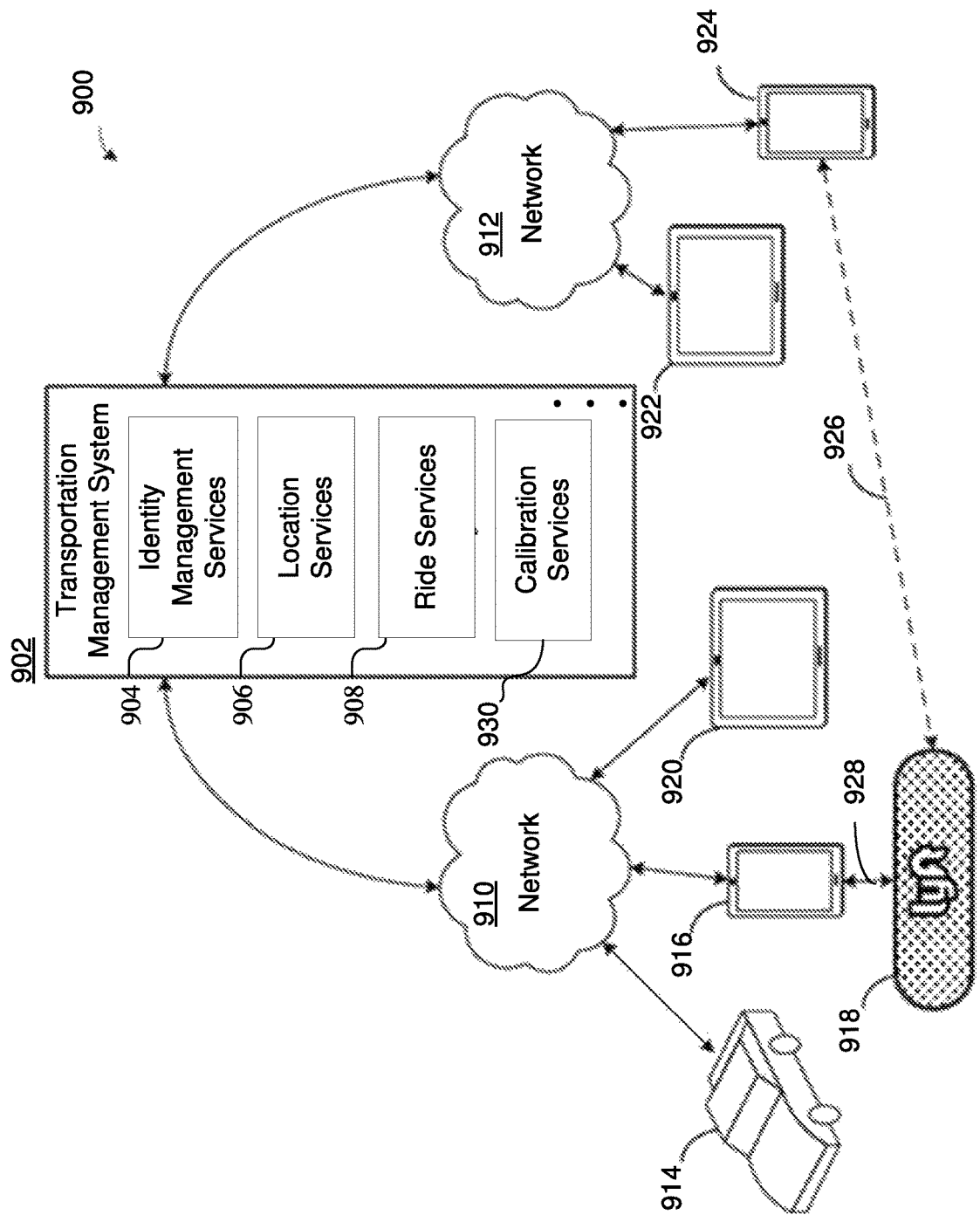
FIG. 9 illustrates an example block diagram of a transportation management environment.

FIG. 9 shows a transportation management environment 900, in accordance with particular embodiments. For example, a transportation management system 902 executing on one or more servers or distributed systems may be configured to provide various services to ride requestors and providers. In particular embodiments, the transportation management system 902 may include software modules or applications, including, e.g., identity management services 904, location services 906, ride services 908, calibration services 930, and/or any other suitable services. Although a particular number of services are shown as being provided by system 902, more or fewer services may be provided in various embodiments. In addition, although these services are shown as being provided by the system 902, all or a portion of any of the services may be processed in a distributed fashion. For example, computations associated with a service task may be performed by a combination of the transportation management system 902 (including any number of servers, databases, etc.), one or more devices associated with the provider (e.g., devices integrated with the managed vehicles 914, provider's computing devices 916 and tablets 920, and transportation management vehicle devices 918), and/or one or more devices associated with the ride requestor (e.g., the requestor's computing devices 924 and tablets 922). In particular embodiments, the transportation management system 902 may include one or more general purpose computers, server computers, distributed computing systems, clustered computing systems, cloud-based computing systems, or any other computing systems or arrangements of computing systems. The transportation management system 902 may be configured to run any or all of the services and/or software applications described herein. In particular embodiments, the transportation management system 902 may include an appropriate operating system as well as various server applications, such as web servers capable of handling hypertext transport protocol (HTTP) requests, file transfer protocol (FTP) servers, database servers, etc.

In particular embodiments, identity management services 904 may be configured to, e.g., perform authorization services for requestors and providers and manage their interactions and data with the transportation management system 902. This may include, e.g., authenticating the identity of providers and determining that they are authorized to provide services through the transportation management system 902. Similarly, requestors' identities may be authenticated to determine whether they are authorized to receive the requested services through the transportation management system 902. Identity management services 904 may also manage and control access to provider and requestor data maintained by the transportation management system 902, such as driving and/or ride histories, vehicle data, personal data, preferences, usage patterns as a ride provider and as a ride requestor, profile pictures, linked third-party accounts (e.g., credentials for music or entertainment services, social-networking systems, calendar systems, task-management systems, etc.) and any other associated information. The management service 904 may also manage and control access to provider/requestor data stored with and/or obtained from third-party systems. For example, a requester or provider may grant the transportation management system 902 access to a third-party email, calendar, or task management system (e.g., via the user's credentials). As another example, a requestor or provider may grant, through a mobile device (e.g., 916, 920, 922, and 924), a transportation application associated with the transportation management system 902 access to data provided by other applications installed on the mobile device. Such data may be processed on the client and/or uploaded to the transportation management system 902 for processing, if so desired.

In particular embodiments, the transportation management system 902 may provide location services 906, which may include navigation and/or traffic management services and user interfaces. For example, the location services 906 may be responsible for querying devices associated with the provider (e.g., vehicle 914, computing device 916, tablet 920, transportation management vehicle device 918) and the requester (e.g., computing device 924 and tablet 922) for their locations. The location services 906 may also be configured to track those devices to determine their relative proximities, generate relevant alerts (e.g., proximity is within a threshold distance), generate navigation recommendations, and any other location-based services.

In particular embodiments, the transportation management system 902 may provide ride services 908, which may include ride matching and management services to connect a requestor to a provider. For example, after the identity of a ride requestor has been authenticated by the identity management services module 904, the ride services module 908 may attempt to match the requestor with one or more ride providers. In particular embodiments, the ride services module 908 may identify an appropriate provider using location data obtained from the location services module 906. The ride services module 908 may use the location data to identify providers who are geographically close to the requestor (e.g., within a certain threshold distance or travel time) and further identify those who are a good match with the requestor. The ride services module 908 may implement matching algorithms that score providers based on, e.g.: preferences of providers and requestors; vehicle features, amenities, condition, and status; provider's preferred general travel direction, range of travel, and availability; requestor's origination and destination locations, time constraints, and vehicle feature needs; and any other pertinent information for matching requestors with providers. In particular embodiments, the ride services 908 may use rule-based algorithms or machine-learning models for matching requestors and providers.

In particular embodiments, the transportation management system 902 may provide calibration services 930, which may include requesting that a vehicle travel to a location to use a camera and LiDAR position calibration system 100 when it is determined that the calibration between the camera sensors and LiDAR sensor is not aligned or no longer aligned. The calibration services 930 may use location data to identify providers of calibration services who are geographically close to the requestor (e.g., within a certain threshold distance or travel time).

The transportation management system 902 may communicatively connect to various devices through networks 910 and 912. Networks 910, 912 may include any combination of interconnected networks configured to send and/or receive data communications using various communication protocols and transmission technologies. In particular embodiments, networks 910, 912 may include local area networks (LAN), wide-area network, and/or the Internet, and may support communication protocols such as transmission control protocol/Internet protocol (TCP/IP), Internet packet exchange (IPX), systems network architecture (SNA), and any other suitable network protocols. In particular embodiments, data may be transmitted through networks 910, 912 using a mobile network (such as a mobile telephone network, cellular network, satellite network, or another mobile network), PSTNs (a public switched telephone networks), wired communication protocols (e.g., USB, CAN), and/or wireless communication protocols (e.g., WLAN technologies implementing the IEEE 802.11 family of standards, Bluetooth, Bluetooth Low Energy, NFC, Z-Wave, and ZigBee). In particular embodiments, networks 910, 912 may each include any combination of networks described herein or known to one of ordinary skill in the art.

In particular embodiments, devices within a vehicle may be interconnected. For example, any combination of the following may be communicatively connected: vehicle 914, provider computing device 916, provider tablet 920, transportation management vehicle device 918, requestor computing device 924, requestor tablet 922, and any other device (e.g., smart watch, smart tags, etc.). For example, the transportation management vehicle device 918 may be communicatively connected to the provider computing device 916 and/or the requestor computing device 924. The transportation management vehicle device 918 may connect 926, 928 to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In particular embodiments, users may utilize and interface with one or more services provided by the transportation management system 902 using applications executing on their respective computing devices (e.g., 914, 916, 918, and/or 920), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In particular embodiments, provider computing device 914 may be an add-on device to the vehicle, such as a vehicle navigation system, or a computing device that is integrated with the vehicle, such as the management system of an autonomous vehicle. The computing device may run on any suitable operating systems, such as Android®, iOS®, macOS®, Windows®, Linux®, UNIX®, or UNIX®-based or Linux®-based operating systems, or any other type of operating system or firmware. The computing device may further be configured to send and receive data over the Internet, short message service (SMS), email, and various other messaging applications and/or communication protocols. In particular embodiments, one or more software applications may be installed on the computing device of a provider or requestor, including an application associated with the transportation management system 902. The transportation application may, for example, be distributed by an entity associated with the transportation management system via any distribution channel, such as an online source from which applications may be downloaded and/or via physical media, such as CDs and DVDs. Additional third-party applications unassociated with the transportation management system may also be installed on the computing device. In particular embodiments, the transportation application may communicate or share data and resources with one or more of the installed third-party applications.

Figure 10:
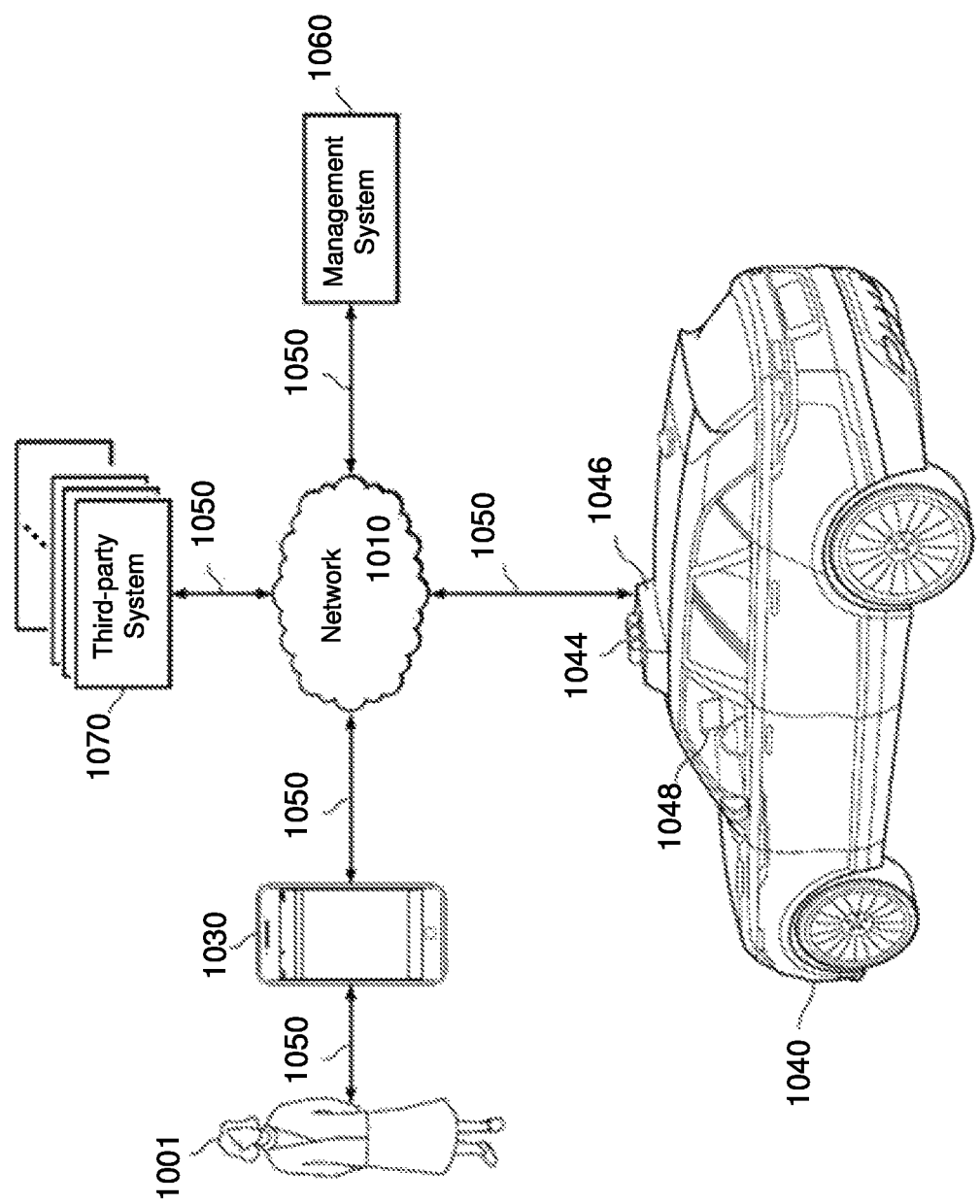
FIG. 10 illustrates an example block diagram of a transportation management environment for matching ride requestors with autonomous vehicles.

FIG. 10 illustrates an example block diagram of a transportation management environment for matching ride requestors with autonomous vehicles. In particular embodiments, the environment may include various computing entities, such as a user computing device 1030 of a user 1001 (e.g., a ride provider or requestor), a transportation management system 1060, an autonomous vehicle 1040, and one or more third-party system 1070. The computing entities may be communicatively connected over any suitable network 1010. As an example and not by way of limitation, one or more portions of network 1010 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 10 illustrates a single user device 1030, a single transportation management system 1060, a single vehicle 1040, a plurality of third-party systems 1070, and a single network 1010, this disclosure contemplates any suitable number of each of these entities. As an example and not by way of limitation, the network environment may include multiple users 1001, user devices 1030, transportation management systems 1060, autonomous-vehicles 1040, third-party systems 1070, and networks 1010.

The user device 1030, transportation management system 1060, autonomous vehicle 1040, and third-party system 1070 may be communicatively connected or co-located with each other in whole or in part. These computing entities may communicate via different transmission technologies and network types. For example, the user device 1030 and the vehicle 1040 may communicate with each other via a cable or short-range wireless communication (e.g., Bluetooth, NFC, WI-FI, etc.), and together they may be connected to the Internet via a cellular network that is accessible to either one of the devices (e.g., the user device 1030 may be a smartphone with LTE connection). The transportation management system 1060 and third-party system 1070, on the other hand, may be connected to the Internet via their respective LAN/WLAN networks and Internet Service Providers (ISP). FIG. 10 illustrates transmission links 1050 that connect user device 1030, autonomous vehicle 1040, transportation management system 1060, and third-party system 1070 to communication network 1010. This disclosure contemplates any suitable transmission links 1050, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 1050 may connect to one or more networks 1010, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 1050. For example, the user device 1030 may communicate with the transportation management system via a cellular network and the Internet, but communicate with the autonomous vehicle 1040 via Bluetooth or a physical wire connection.

In particular embodiments, the transportation management system 1060 may fulfill ride requests for one or more users 1001 by dispatching suitable vehicles. The transportation management system 1060 may receive any number of ride requests from any number of ride requestors 1001. In particular embodiments, a ride request from a ride requestor 1001 may include an identifier that identifies the ride requestor in the system 1060. The transportation management system 1060 may use the identifier to access and store the ride requestor's 1001 information, in accordance with the requestor's 1001 privacy settings. The ride requestor's 1001 information may be stored in one or more data stores (e.g., a relational database system) associated with and accessible to the transportation management system 1060. In particular embodiments, ride requestor information may include profile information about a particular ride requestor 1001. In particular embodiments, the ride requestor 1001 may be associated with one or more categories or types, through which the ride requestor 1001 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 1060 may classify a user 1001 based on known information about the user 1001 (e.g., using machine-learning classifiers), and use the classification to retrieve relevant aggregate information associated with that class. For example, the system 1060 may classify a user 1001 as a young adult and retrieve relevant aggregate information associated with young adults, such as the type of music generally preferred by young adults.

Transportation management system 1060 may also store and access ride information. Ride information may include locations related to the ride, traffic data, route options, optimal pick-up or drop-off locations for the ride, or any other suitable information associated with a ride. As an example and not by way of limitation, when the transportation management system 1060 receives a request to travel from San Francisco International Airport (SFO) to Palo Alto, Calif., the system 1060 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 1060. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 1060. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 1060 in particular embodiments may predict and provide ride suggestions in response to a ride request. In particular embodiments, the system 1060 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 1060 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 1060 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 1030 (which may belong to a ride requestor or provider), a transportation management system 1060, vehicle system 1040, or a third-party system 1070 to process, transform, manage, retrieve, modify, add, or delete the information stored in the data store.

In particular embodiments, transportation management system 1060 may include an authorization server (or any other suitable component(s)) that allows users 1001 to opt-in to or opt-out of having their information and actions logged, recorded, or sensed by transportation management system 1060 or shared with other systems (e.g., third-party systems 1070). In particular embodiments, a user 1001 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1001 of transportation management system 1060 through blocking, data hashing, anonymization, or other suitable techniques as appropriate.

In particular embodiments, third-party system 1070 may be a network-addressable computing system that may provide HD maps or host GPS maps, customer reviews, music or content, weather information, or any other suitable type of information. Third-party system 1070 may generate, store, receive, and send relevant data, such as, for example, map data, customer review data from a customer review website, weather data, or any other suitable type of data. Third-party system 1070 may be accessed by the other computing entities of the network environment either directly or via network 1010. For example, user device 1030 may access the third-party system 1070 via network 1010, or via transportation management system 1060. In the latter case, if credentials are required to access the third-party system 1070, the user 1001 may provide such information to the transportation management system 1060, which may serve as a proxy for accessing content from the third-party system 1070.

In particular embodiments, user device 1030 may be a mobile computing device such as a smartphone, tablet computer, or laptop computer. User device 1030 may include one or more processors (e.g., CPU and/or GPU), memory, and storage. An operating system and applications may be installed on the user device 1030, such as, e.g., a transportation application associated with the transportation management system 1060, applications associated with third-party systems 1070, and applications associated with the operating system. User device 1030 may include functionality for determining its location, direction, or orientation, based on integrated sensors such as GPS, compass, gyroscope, or accelerometer. User device 1030 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 1030 may also include one or more cameras, scanners, touchscreens, microphones, speakers, and any other suitable input-output devices.

In particular embodiments, the vehicle 1040 may be an autonomous vehicle and equipped with an array of sensors 1044, a navigation system 1046, and a ride-service computing device 1048. In particular embodiments, a fleet of autonomous vehicles 1040 may be managed by the transportation management system 1060. The fleet of autonomous vehicles 1040, in whole or in part, may be owned by the entity associated with the transportation management system 1060, or they may be owned by a third-party entity relative to the transportation management system 1060. In either case, the transportation management system 1060 may control the operations of the autonomous vehicles 1040, including, e.g., dispatching select vehicles 1040 to fulfill ride requests, instructing the vehicles 1040 to perform select operations (e.g., head to a service center or charging/fueling station, pull over, stop immediately, self-diagnose, lock/unlock compartments, change music station, change temperature, and any other suitable operations), and instructing the vehicles 1040 to enter select operation modes (e.g., operate normally, drive at a reduced speed, drive under the command of human operators, and any other suitable operational modes).

In particular embodiments, the autonomous vehicles 1040 may receive data from and transmit data to the transportation management system 1060 and the third-party system 1070. Example of received data may include, e.g., instructions, new software or software updates, maps, 3D models, trained or untrained machine-learning models, location information (e.g., location of the ride requestor, the autonomous vehicle 1040 itself, other autonomous vehicles 1040, and target destinations such as service centers), navigation information, traffic information, weather information, entertainment content (e.g., music, video, and news) ride requestor information, ride information, and any other suitable information. Examples of data transmitted from the autonomous vehicle 1040 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1040, passengers may send/receive data to the transportation management system 1060 and/or third-party system 1070), and any other suitable data.

In particular embodiments, autonomous vehicles 1040 may also communicate with each other as well as other traditional human-driven vehicles, including those managed and not managed by the transportation management system 1060. For example, one vehicle 1040 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 1060 or third-party system 1070).

In particular embodiments, an autonomous vehicle 1040 may obtain and process sensor/telemetry data. Such data may be captured by any suitable sensors. For example, the vehicle 1040 may have aa Light Detection and Ranging (LiDAR) sensor array of multiple LiDAR transceivers that are configured to rotate 360°, emitting pulsed laser light and measuring the reflected light from objects surrounding vehicle 1040. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 1040. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 1040 may have optical cameras pointing in different directions. The cameras may be used for, e.g., recognizing roads, lane markings, street signs, traffic lights, police, other vehicles, and any other visible objects of interest. To enable the vehicle 1040 to "see" at night, infrared cameras may be installed. In particular embodiments, the vehicle may be equipped with stereo vision for, e.g., spotting hazards such as pedestrians or tree branches on the road. As another example, the vehicle 1040 may have radars for, e.g., detecting other vehicles and/or hazards afar. Furthermore, the vehicle 1040 may have ultrasound equipment for, e.g., parking and obstacle detection. In addition to sensors enabling the vehicle 1040 to detect, measure, and understand the external world around it, the vehicle 1040 may further be equipped with sensors for detecting and self-diagnosing the vehicle's own state and condition. For example, the vehicle 1040 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 1040 may build a 3D model of its surrounding based on data from its LiDAR, radar, sonar, and cameras, along with a pre-generated map obtained from the transportation management system 1060 or the third-party system 1070. Although sensors 1044 appear in a particular location on autonomous vehicle 1040 in FIG. 10, sensors 1044 may be located in any suitable location in or on autonomous vehicle 1040. Example locations for sensors include the front and rear bumpers, the doors, the front windshield, on the side panel, or any other suitable location.

In particular embodiments, the autonomous vehicle 1040 may be equipped with a processing unit (e.g., one or more CPUs and GPUs), memory, and storage. The vehicle 1040 may thus be equipped to perform a variety of computational and processing tasks, including processing the sensor data, extracting useful information, and operating accordingly. For example, based on images captured by its cameras and a machine-vision model, the vehicle 1040 may identify particular types of objects captured by the images, such as pedestrians, other vehicles, lanes, curbs, and any other objects of interest.

In particular embodiments, the autonomous vehicle 1040 may have a navigation system 1046 responsible for safely navigating the autonomous vehicle 1040. In particular embodiments, the navigation system 1046 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1046 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 1046 may use its determinations to control the vehicle 1040 to operate in prescribed manners and to guide the autonomous vehicle 1040 to its destinations without colliding into other objects. Although the physical embodiment of the navigation system 1046 (e.g., the processing unit) appears in a particular location on autonomous vehicle 1040 in FIG. 10, navigation system 1046 may be located in any suitable location in or on autonomous vehicle 1040. Example locations for navigation system 1046 include inside the cabin or passenger compartment of autonomous vehicle 1040, near the engine/battery, near the front seats, rear seats, or in any other suitable location.

In particular embodiments, the autonomous vehicle 1040 may be equipped with a ride-service computing device 1048, which may be a tablet or any other suitable device installed by transportation management system 1060 to allow the user to interact with the autonomous vehicle 1040, transportation management system 1060, other users 1001, or third-party systems 1070. In particular embodiments, installation of ride-service computing device 1048 may be accomplished by placing the ride-service computing device 1048 inside autonomous vehicle 1040, and configuring it to communicate with the vehicle 1040 via a wire or wireless connection (e.g., via Bluetooth). Although FIG. 10 illustrates a single ride-service computing device 1048 at a particular location in autonomous vehicle 1040, autonomous vehicle 1040 may include several ride-service computing devices 1048 in several different locations within the vehicle. As an example and not by way of limitation, autonomous vehicle 1040 may include four ride-service computing devices 1048 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 1048 may be detachable from any component of autonomous vehicle 1040. This may allow users to handle ride-service computing device 1048 in a manner consistent with other tablet computing devices. As an example and not by way of limitation, a user may move ride-service computing device 1048 to any location in the cabin or passenger compartment of autonomous vehicle 1040, may hold ride-service computing device 1048, or handle ride-service computing device 1048 in any other suitable manner. Although this disclosure describes providing a particular computing device in a particular manner, this disclosure contemplates providing any suitable computing device in any suitable manner.

Figure 11:
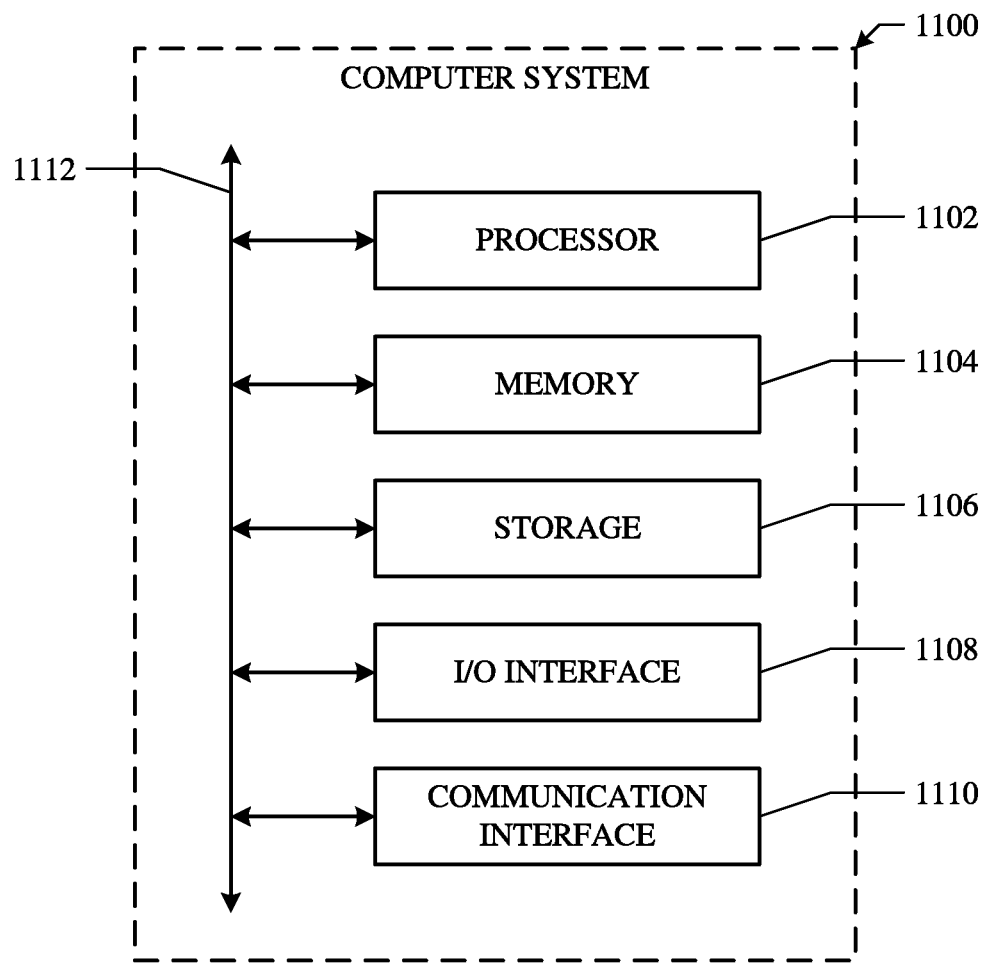
FIG. 11 illustrates an example of a computing system.

FIG. 11 illustrates an example computer system 1100. In particular embodiments, one or more computer systems 1100 perform one or more steps of one or more methods described or illustrated herein. In particular embodiments, one or more computer systems 1100 provide the functionalities described or illustrated/herein. In particular embodiments, software running on one or more computer systems 1100 performs one or more steps of one or more methods described or illustrated herein or provides the functionalities described or illustrated herein. Particular embodiments include one or more portions of one or more computer systems 1100. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 that are to be operated on by computer instructions; the results of previous instructions executed by processor 1102 that are accessible to subsequent instructions or for writing to memory 1104 or storage 1106; or any other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs), be a multi-core processor, or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system

1100 may load instructions from storage 1106 or another source (such as another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described in further detail below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   capturing, by a plurality of image sensors on an automotive vehicle, image data associated with one or more calibration objects in an environment;
   capturing, by a LiDAR sensor, a three-dimensional LiDAR point cloud based on LiDAR data;
   generating a three-dimensional image point cloud based on the image data and the three-dimensional LiDAR point cloud;
   mapping a first alignment plane of the three-dimensional image point cloud relative to a second alignment plane of the three-dimensional LiDAR point cloud for each of the calibration objects to determine a three-dimensional angle between the first alignment plane and second alignment plane; and
   calibrating the LiDAR sensor relative to the image sensors by determining a degree of rotation of the LiDAR sensor to minimize the three-dimensional angle between the first alignment plane and second alignment plane.

2. The method of claim 1, further comprising, before mapping the first alignment plane of the three-dimensional image point cloud relative to the second alignment plane of the three-dimensional LiDAR point cloud:
   filtering the three-dimensional LiDAR point cloud to remove irrelevant points.

3. The method of claim 2, wherein the filtering to remove irrelevant points on the three-dimensional LiDAR point cloud comprises:
   for each point on the three-dimensional LiDAR point cloud, determine a distance of the point to the first alignment plane of the three-dimensional image point cloud,
   wherein if the distance of the point to the first alignment plane is more than a predetermined threshold amount, remove the point from the three-dimensional LiDAR point cloud.

4. The method of claim 2, wherein the filtering to remove irrelevant points on the three-dimensional LiDAR point cloud comprises:
   for each point on the three-dimensional LiDAR point cloud, determine a distance of the point to a nearest neighbor point on the three-dimensional LiDAR point cloud,
   wherein if the distance of the point to the nearest neighbor point is more than a predetermined threshold amount, remove the point from the three-dimensional LiDAR point cloud.

5. The method of claim 1, wherein the image data is captured concurrently with the LiDAR data.

6. The method of claim 1, wherein the determining the rotation of the LiDAR sensor to minimize the three-dimensional angle between the first alignment plane and second alignment plane comprises:
   calculating a first vector normal to the first alignment plane,
   calculating a second vector normal to the second alignment plane, and
   aligning the first vector with the second vector to determine a degree of rotation of the LiDAR sensor.

7. The method of claim 1, wherein the determining the rotation of the LiDAR sensor to minimize the three-dimensional angle between the first alignment plane and second alignment plane comprises:
   calculating a distance from each of the points in the three-dimensional LiDAR point cloud to the first alignment plane, and
   determining a rotation of the LiDAR sensor to minimize the distances from the points in the three-dimensional LiDAR point cloud to the first alignment plane.

8. The method of claim 1, wherein the one or more calibration objects comprise at least two calibration objects.

9. The method of claim 1, wherein each of the one or more calibration objects comprises a planar calibration surface with one or more positional markers.

10. The method of claim 9, wherein each of the one or more positional markers is associated with a unique identifier, and wherein the three-dimensional image point cloud comprises the three-dimensional positions of each of the unique identifiers correlated to each pixel of a three-dimensional image generated based on the image data.

11. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:

capturing, by a plurality of image sensors on an automotive vehicle, image data associated with one or more calibration objects in an environment;

capturing, by a LiDAR sensor, a three-dimensional LiDAR point cloud based on LiDAR data;

generating a three-dimensional image point cloud based on the image data and the three-dimensional LiDAR point cloud;

mapping a first alignment plane of the three-dimensional image point cloud relative to a second alignment plane of the three-dimensional LiDAR point cloud for each of the calibration objects to determine a three-dimensional angle between the first alignment plane and second alignment plane; and calibrating the LiDAR sensor relative to the image sensors by determining a degree of rotation of the LiDAR sensor to minimize the three-dimensional angle between the first alignment plane and second alignment plane.

12. The system of claim 11, wherein the processors are further operable when executing the instructions to perform operations comprising, before mapping the first alignment plane of the three-dimensional image point cloud relative to the second alignment plane of the three-dimensional LiDAR point cloud:

filtering the three-dimensional LiDAR point cloud to remove irrelevant points.

13. The system of claim 12, wherein the filtering to remove irrelevant points on the three-dimensional LiDAR point cloud comprises:

for each point on the three-dimensional LiDAR point cloud, determine a distance of the point to the first alignment plane of the three-dimensional image point cloud, wherein if the distance of the point to the first alignment plane is more than a predetermined threshold amount, remove the point from the three-dimensional LiDAR point cloud.

14. The system of claim 12, wherein the filtering to remove irrelevant points on the three-dimensional LiDAR point cloud comprises:

for each point on the three-dimensional LiDAR point cloud, determine a distance of the point to a nearest neighbor point on the three-dimensional LiDAR point cloud, wherein if the distance of the point to the nearest neighbor point is more than a predetermined threshold amount, remove the point from the three-dimensional LiDAR point cloud.

15. The system of claim 11, wherein the image data is captured concurrently with the LiDAR data.

16. One or more computer-readable non-transitory storage media embodying software that is operable when executed to cause one or more processors to perform operations comprising:

capturing, by a plurality of image sensors on an automotive vehicle, image data associated with one or more calibration objects in an environment;

capturing, by a LiDAR sensor, a three-dimensional LiDAR point cloud based on LiDAR data;

generating a three-dimensional image point cloud based on the image data and the three-dimensional LiDAR point cloud;

mapping a first alignment plane of the three-dimensional image point cloud relative to a second alignment plane of the three-dimensional LiDAR point cloud for each of the calibration objects to determine a three-dimensional angle between the first alignment plane and second alignment plane; and calibrating the LiDAR sensor relative to the image sensors by determining a degree of rotation of the LiDAR sensor to minimize the three-dimensional angle between the first alignment plane and second alignment plane.

17. The media of claim 16, wherein the software is further operable when executed to cause the one or more processors to perform operations comprising, before mapping the first alignment plane of the three-dimensional image point cloud relative to the second alignment plane of the three-dimensional LiDAR point cloud:

filtering the three-dimensional LiDAR point cloud to remove irrelevant points.

18. The media of claim 17, wherein the filtering to remove irrelevant points on the three-dimensional LiDAR point cloud comprises:

for each point on the three-dimensional LiDAR point cloud, determine a distance of the point to the first alignment plane of the three-dimensional image point cloud, wherein if the distance of the point to the first alignment plane is more than a predetermined threshold amount, remove the point from the three-dimensional LiDAR point cloud.

19. The media of claim 17, wherein the filtering to remove irrelevant points on the three-dimensional LiDAR point cloud comprises:

for each point on the three-dimensional LiDAR point cloud, determine a distance of the point to a nearest neighbor point on the three-dimensional LiDAR point cloud, wherein if the distance of the point to the nearest neighbor point is more than a predetermined threshold amount, remove the point from the three-dimensional LiDAR point cloud.

20. The media of claim 16, wherein the image data is captured concurrently with the LiDAR data.

* * * * *